United States Patent
Safak et al.

(10) Patent No.: US 10,963,871 B2
(45) Date of Patent: Mar. 30, 2021

(54) BIN-CONSERVING TOKENIZATION TECHNIQUES GENERATING TOKENS IN REVERSE ORDER AND EMPLOYING COMMON DEVICE PAN WITH DIFFERING PAN SEQUENCE NUMBER VALUES ACROSS TOKEN INSTANCES

(71) Applicant: MasterCard International Incorporated, Purchase, NY (US)

(72) Inventors: Ilgin Safak, White Plains, NY (US); Jean-Robert Raynier, Chaville (FR); Vincent Barnaud, Paris (FR); Bertrand Saby, Madrid (ES)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 567 days.

(21) Appl. No.: 15/821,728

(22) Filed: Nov. 22, 2017

(65) Prior Publication Data
US 2019/0156335 A1    May 23, 2019

(51) Int. Cl.
*G06Q 20/38*    (2012.01)
*G06Q 20/32*    (2012.01)
(Continued)

(52) U.S. Cl.
CPC ......... *G06Q 20/385* (2013.01); *G06Q 20/223* (2013.01); *G06Q 20/322* (2013.01);
(Continued)

(58) Field of Classification Search
CPC .. G06Q 20/223; G06Q 20/385; G06Q 20/322; G06Q 20/3223; G06Q 20/34;
(Continued)

(56) References Cited

U.S. PATENT DOCUMENTS 5,699,528 A    12/1997 Hogan
6,636,833 B1    10/2003 Flitcroft et al.
(Continued)

FOREIGN PATENT DOCUMENTS

WO    WO2012078964 A1    6/2012
WO    WO20131199141    8/2013
WO    WO2014027287 A1    2/2014

OTHER PUBLICATIONS

Transaction Acceptance Device Guide (TADG), Version 3.0 (Year: 2015).*

(Continued)

*Primary Examiner* — James D Nigh
*Assistant Examiner* — Yin Y Cho
(74) *Attorney, Agent, or Firm* — Otterstedt, Wallace & Kammer, LLP

(57) ABSTRACT

A payment token is generated within a token bank identification number (BIN) range, and is linked with an underlying account number of a consumer. A first instance of the token is made available in at least one of a first portable electronic device, a first mobile payment application (MPA), and a first web wallet of the consumer with an associated first primary account sequence number (PSN). A second instance of the token is made available in at least one of a second portable electronic device, a second mobile payment application (MPA), and a second web wallet of the consumer with an associated second primary account sequence number (PSN).

18 Claims, 15 Drawing Sheets

(51) Int. Cl.
  *G06Q 20/36* (2012.01)
  *G06Q 20/34* (2012.01)
  *G06Q 20/22* (2012.01)

(52) U.S. Cl.
  CPC ......... *G06Q 20/3223* (2013.01); *G06Q 20/34* (2013.01); *G06Q 20/3674* (2013.01); *G06Q 20/3829* (2013.01); *G06Q 20/38215* (2013.01); *G06Q 20/36* (2013.01); *G06Q 2220/00* (2013.01)

(58) Field of Classification Search
  CPC ......... G06Q 20/3674; G06Q 20/38215; G06Q 20/36; G06Q 20/3829; G06Q 2220/00
  USPC .......................................................... 705/67
  See application file for complete search history.

(56) References Cited

U.S. PATENT DOCUMENTS

| | | | |
|---|---|---|---|
| 7,136,835 | B1 | 11/2006 | Flitcroft et al. |
| 2010/0100480 | A1 | 4/2010 | Altman et al. |
| 2011/0251952 | A1 | 10/2011 | Kelly et al. |
| 2012/0197788 | A1 | 8/2012 | Sanghvi et al. |
| 2012/0215688 | A1* | 8/2012 | Musser et al. |
| 2013/0151400 | A1* | 6/2013 | Makhotin et al. |
| 2013/0275307 | A1 | 10/2013 | Khan |
| 2013/0290177 | A1 | 10/2013 | Milam et al. |
| 2013/0311362 | A1 | 11/2013 | Milam et al. |
| 2014/0344153 | A1* | 11/2014 | Raj et al. |
| 2015/0046339 | A1* | 2/2015 | Wong et al. |
| 2015/0088745 | A1 | 3/2015 | Phillips et al. |
| 2015/0112817 | A1* | 4/2015 | Hamilton |
| 2015/0199679 | A1 | 7/2015 | Palanisamy et al. |
| 2016/0078436 | A1 | 3/2016 | Tomasofsky et al. |
| 2016/0092981 | A1 | 3/2016 | Ghosh |
| 2016/0148197 | A1 | 5/2016 | Dimmick |
| 2016/0210600 | A1 | 7/2016 | Sobek |
| 2016/0217467 | A1 | 7/2016 | Smets et al. |
| 2016/0321652 | A1 | 11/2016 | Dimmick et al. |
| 2017/0017937 | A1* | 1/2017 | Lim et al. |

OTHER PUBLICATIONS

PayPal Credit, PayPal Credit FAQs, Apply for PayPal Credit and start enjoying more time to pay, downloaded May 16, 2017from https://www.paypalcredit.com/index.html#faqs, pp. 1-7.

Mastercard Digital Enablement Service—Ensure every transaction is secure with card tokenization—downloaded Nov. 24, 2017 from https://developer.mastercard.com/product/mdes, pp. 1-8, MasterCard International Incorporated, (c) 1994-2017.

CoreLogic, Credco, Understanding Credit & Credit Risk Scores, Plus, Helping Consumer Get the Most From Their Credit Rating, 2011, pp. 1-26.

How Credit History Impacts Your Credit Score | myFICO, downloaded Nov. 24, 2017 from https://www.myfico.com/credit-education/whats-in-your-credit-score/, pp. 1-4.

Tim Kanning, "Autoscout24 offers loans within minutes," Frankfurter Allgemeine Finances, May 16, 2017, pp. 1-3, downloaded May 16, 2017 from http://www.faz.net/aktuell/finanzen/digitalbezahlen/autoscout24undbankentreteninkonkurrenz14379894.html?GEPC=s5.

Information Security Group at the University College London, EMV tag 5F34 (Application Primary Account Number (PAN) Sequence) p. 1, downloadedJul. 25, 2017 from https://www.emvlab.org/emvtags/show/t5F34/.

EMVCo, LLC, "EMV Payment Tokenisation—Payment Account Reference," Clarifications From Specification Bulletin No. 167, First Edition, Jan. 2016, pp. 1-3.

EMVCo, LLC, EMV®* Payment Tokenisation Specification, Technical Framework Version 1.0 Mar. 2014, pp. 1-84,.

EMVCo, LLC, EMV® Payment Account Reference (PAR), EMVCo White Paper on Payment Account Reference (PAR), Version 1.0, Nov. 2016, pp. i-xiv, 1-10.

Mastercard Developers, Spend Controls, downloaded Oct. 27, 2017 from https://developermastercard.com/product/spend-controls, pp. 1-3.

MCommerce | Digital Payment Systems Contactless Payments | MDES, Building the future of digital payments, downloaded Jun. 1, 2017 from https://www.mastercard.us/enus/issuers/productsandsolutions/growmanageyourbusiness/digitalcommercesolutions.html, pp. 1-4.

MasterCard International Incorporated, Mastercard Mobile Payments SDK Frequently Asked Questions MP SDK 2.1.0, pp. 1-23 (last page blank), Copyright © 2017 MasterCard, downloaded Sep. 27, 2017 https://developer.mastercard.com/media/01/af/7b30030a420fa27ee951fe555bfc/mp-sdk-2.1.0-FAQ.pdf.

Ahmed Soliman, EPO as ISA, Patent Cooperation Treaty International Search Report, PCT/US2018/054505, dated Feb. 12, 2019, 6 pages.

Ahmed Soliman, EPO as ISA, Patent Cooperation Treaty Written Opinion, PCT/US2018/054505, dated Feb. 12, 2019, 5 pages.

* cited by examiner

BIN-CONSERVING TOKENIZATION TECHNIQUES GENERATING TOKENS IN REVERSE ORDER AND EMPLOYING COMMON DEVICE PAN WITH DIFFERING PAN SEQUENCE NUMBER VALUES ACROSS TOKEN INSTANCES

FIELD OF THE INVENTION

The present invention relates generally to the electronic and computer arts, and, more particularly, to issuance of digital credentials for use in electronic transactions and to providing personalized offers to consumers in connection with same, and the like.

BACKGROUND OF THE INVENTION

A detailed discussion of current tokenization techniques can be found in the document "EMV® Payment Tokenisation Specification: Technical Framework," Version 1.0, March 2014, EMVCo, LLC ("EMVCo"), expressly incorporated herein by reference in its entirety for all purposes. EMV is a registered trademark in the U.S. and other countries and an unregistered trademark elsewhere. The EMV trademark is owned by EMVCo.

The payments industry is evolving to support payment form factors that provide increased protection against counterfeit, account misuse, and other types of inappropriate conduct. While EMV chip cards provide substantial protection for card-present transactions, it is desirable minimize unauthorized use of account data and to reduce the potential for misconduct in card-not-present and emerging transaction environments which combine elements of card-present and card-not-present transactions. Payment tokenization systems are appropriate to help achieve these goals.

Payment tokens are surrogate values that replace the Primary Account Number (PAN) in the payments ecosystem. In order for payment tokens to provide improved protection against misuse, the payment token is limited to use in a specific domain, such as to a specific merchant or channel. Pertinent parties in token provisioning include the cardholder, merchant or digital wallet, token requestor, token service provider, and issuer. Pertinent parties in use, depending on the use case, typically include the merchant, acquirer, payment network, issuer, and token service provider.

Currently, a physical card is created first and then one or more tokens are created. Tokens are generated within a BIN range or Card range that has been designated as a Token BIN Range. In current systems, a new payment token number is used each time a payment token corresponding to the physical card is provisioned for a new device or wallet, resulting in potential exhaustion of available token BIN ranges.

SUMMARY OF THE INVENTION

Principles of the present invention provide bin-conserving tokenization techniques generating tokens in reverse order and employing a common device primary account number (PAN) with differing PAN sequence number values across token instances. In one aspect, an exemplary method, according to an aspect of the invention, includes generating a payment token, the payment token being generated within a token bank identification number (BIN) range; linking the payment token with an underlying account number of a consumer; making a first instance of the token available in at least one of a first portable electronic device, a first mobile payment application (MPA), and a first web wallet of the consumer with an associated first primary account sequence number (PSN); and making a second instance of the token available in at least one of a second portable electronic device, a second mobile payment application (MPA), and a second web wallet of the consumer with an associated second primary account sequence number (PSN).

In another aspect, an exemplary apparatus, according to another aspect of the invention, includes a memory; and at least one processor, coupled to the memory, and operative to perform any one, some, or all of the described method steps. In a non-limiting example, the memory configures the processor to implement a token provisioning platform of a token service provider that carries out the generating and linking steps, and a credential management system of a token service provider that carries out the steps of making the instances of the token available.

Aspects of the invention contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps (e.g., when instructions from a persistent storage device are loaded into the memory to configure the processor). Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, such as reducing the number of bank identification numbers (BINs) consumed in tokenization schemes, as will be appreciated by the skilled artisan from the discussion herein. Another substantial beneficial technical effect is that it simplifies the process of linking tokens with consumer accounts (token mapping), thereby reducing operational costs. Token mapping is used to keep track of which token is associated with which consumer account, as well as to hide the actual card information from the merchant and acquirer during authorization & clearing. Currently, there is no method of associating all tokens issued to a consumer account. The notion of a Payment Account Reference (PAR) is recently introduced to link all tokens associated with a certain consumer account. Reference is made to the "EMVCo White Paper on Payment Account Reference (PAR)," Version 1.0, November 2016, published by EMVCo, LLC, and expressly incorporated herein by reference in its entirety for all purposes.

However, generation of an additional identifier creates an increased operational cost and complexity, as it adds additional steps/processes for generating and linking the tokens with the identifier and consumer account, as well as having to store additional information in the database. One or more embodiments eliminate the need for an additional identifier. Since each token will have the same token PAN with varying PSN values, a single mapping between a token and consumer account is sufficient to link all tokens.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
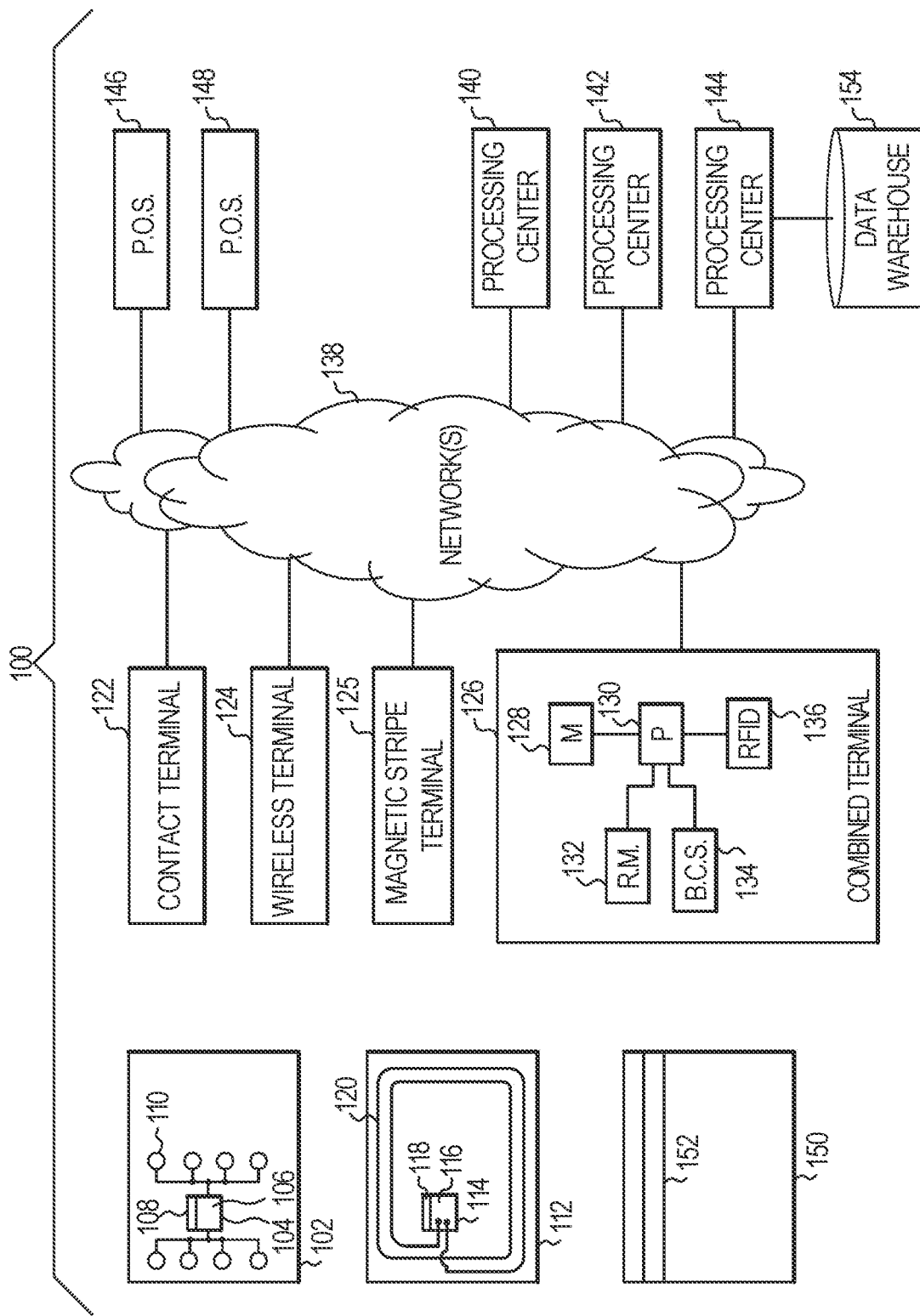
FIG. 1 shows an example of a system and various components thereof that can implement at least a portion of some techniques of the invention.

With regard to payment card and similar payments, attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional card 150 having a magnetic stripe 152. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, Wash.3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the MasterCard® Contactless specifications (the skilled artisan will appreciate that MASTERCARD CONTACTLESS was formerly known as MASTERCARD PAYPASS), available under license from MasterCard International Incorporated of Purchase, NY, USA (marks of MasterCard International Incorporated of Purchase, NY, USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

For completeness, it should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction. It should be noted that one or more embodiments are directed to token-based transactions as opposed to PAN-based transactions.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
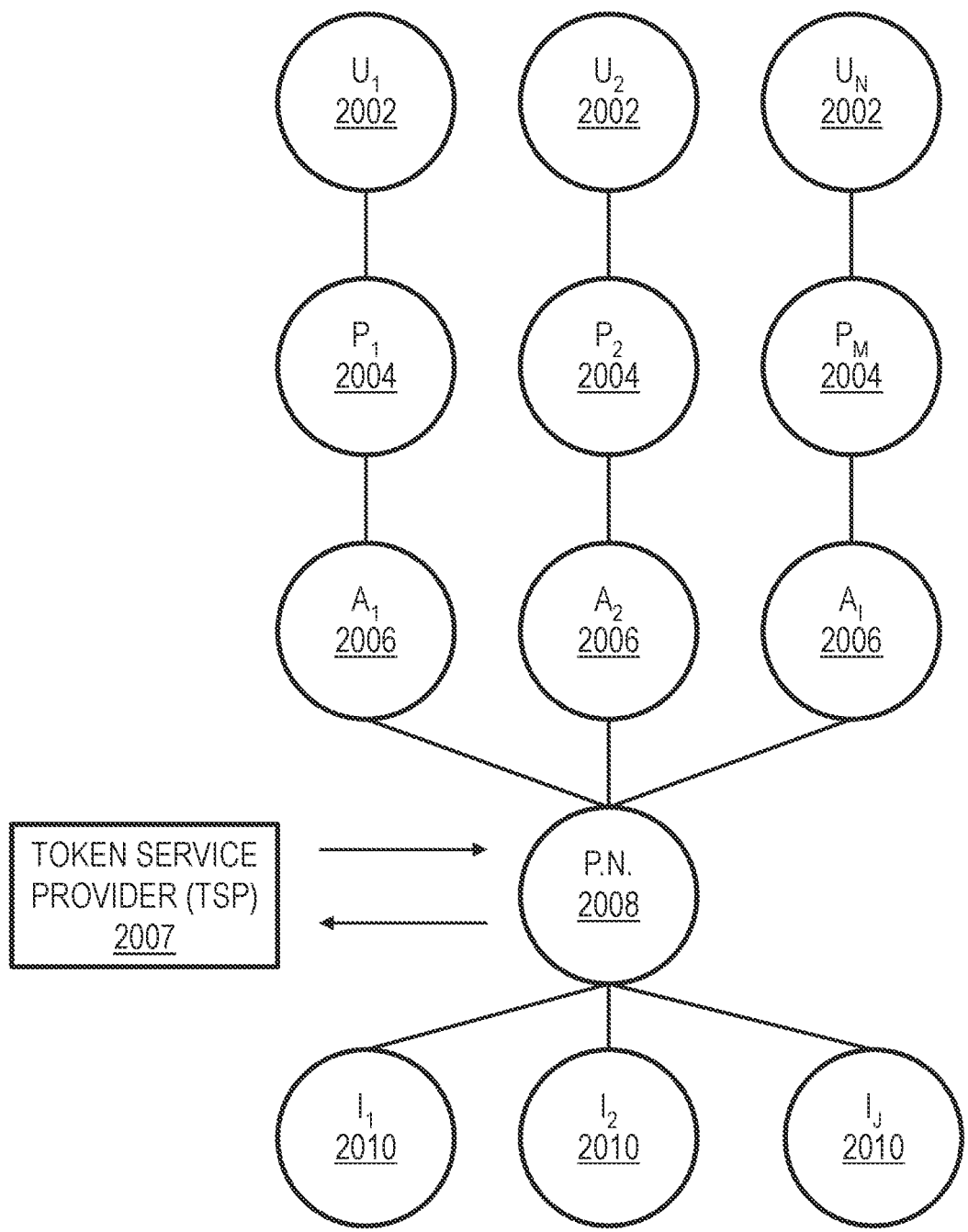
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the invention.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Consider token service provider (TSP) 2007. Referring to the EMV® Payment Tokenisation Specification: Technical Framework FIG. 2: Payment Token Transaction Overview, when a system such as that in FIG. 2 is used with tokens, the cardholder 2002 provides the token to the merchant 2004, which relays same to the acquirer 2006, which forwards same to the network 2008. The network 2008 then provides the token to the TSP 2007, which returns the actual PAN corresponding to the token. This is then provided to the issuer 2010; the issuer makes the auth decision based on the actual PAN but the PAN value is not passed back to the acquirer or merchant in the auth response; these parties only see the token. Referring to the EMV® Payment Tokenisation Specification: Technical Framework FIG. 2: Payment Token Provisioning Overview, during provisioning, the cardholder 2002 provides the PAN to the merchant 2004 or a digital wallet, e.g., which, functioning as a token requestor, requests tokenization from TSP 2007. The TSP then interacts with the issuer 2010 for token assurance (ID&V discussed below) with subsequent provisioning of the token.

Messages within a network such as network 138 and/or network 2008, may, in at least some instances, conform to the International Organization for Standardization (ISO) Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

ISO 8583:1993 (1993)

ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812- compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN)(which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, New York, USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

It is also contemplated that payment card networks can function with tokens as described herein.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. One or more embodiments are applicable to many other different kinds of payment card networks as well; the AMERICAN EXPRESS® network and the DISCOVER® network are non-limiting examples.

Figure 6:
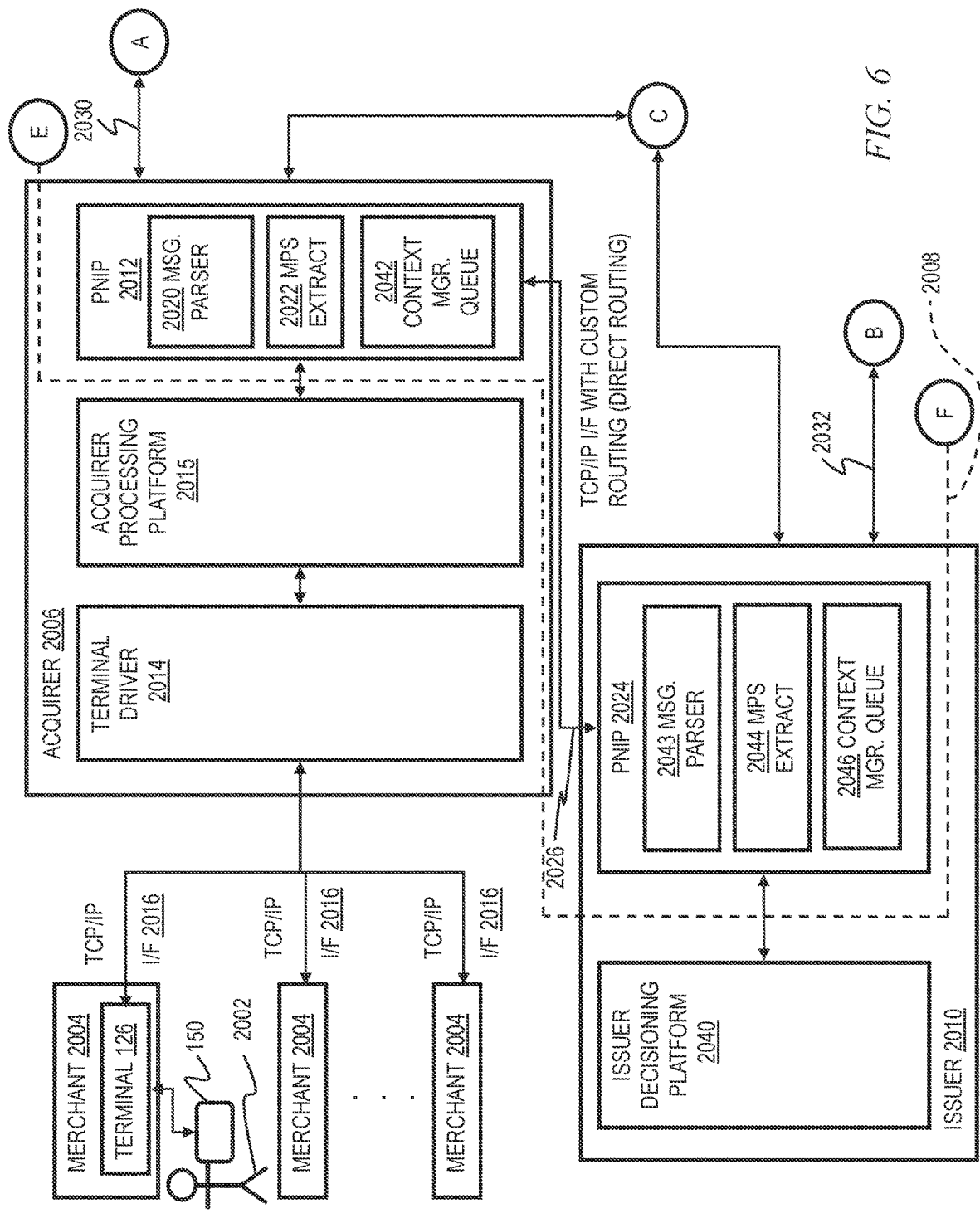
FIGS. 6 and 7 provide an exemplary detailed view of operation of a payment card network, in accordance with an aspect of the disclosure.
Figure 7:
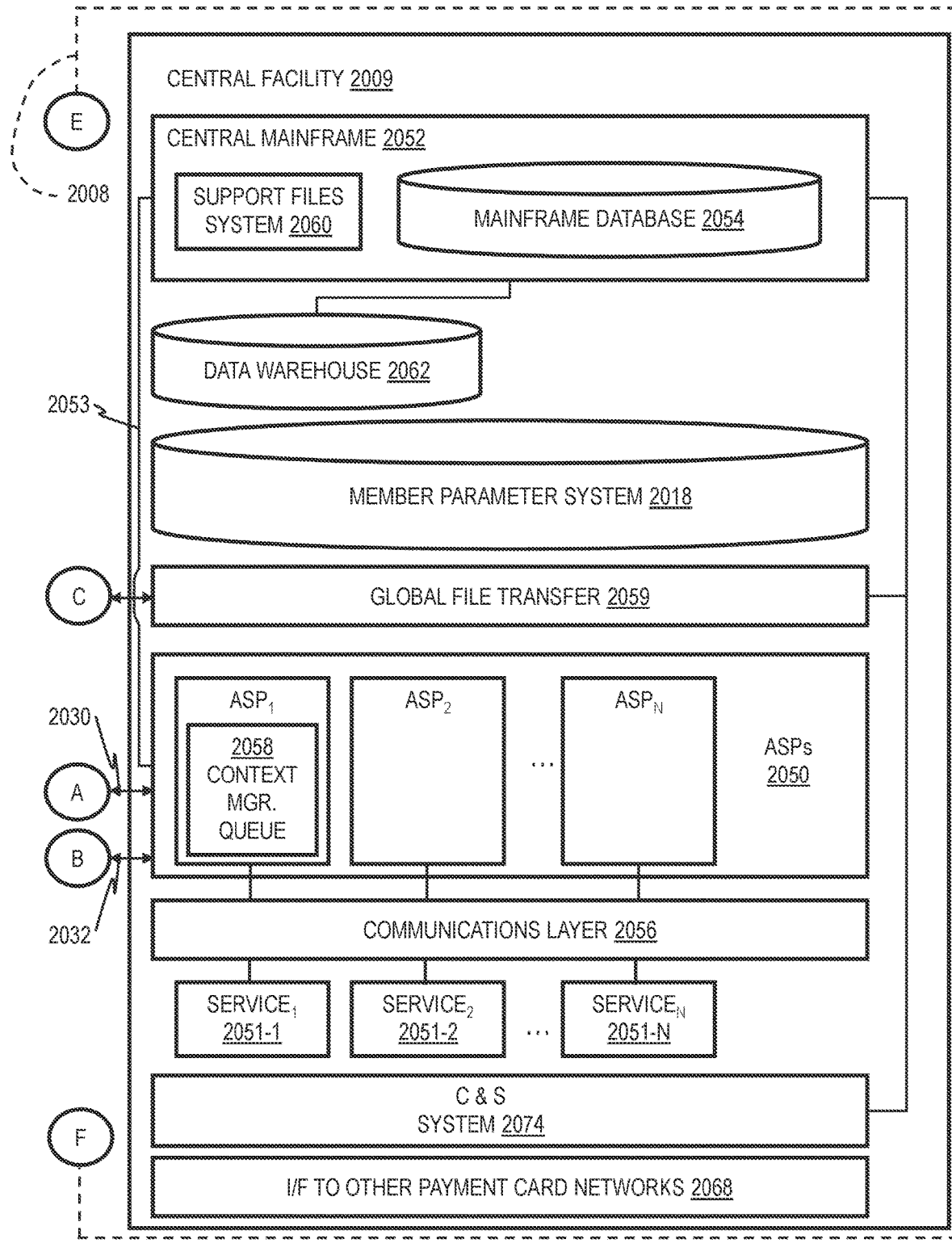

Still referring to FIG. 2, and with reference also now to FIGS. 6 and 7, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (for example, by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 6 and 7 encompasses the network 2008. Note generally that points A, B, C, E, and F in FIG. 6 connect to the corresponding points in FIG. 7; the entire network and associated environment are not amenable to illustration on a single sheet.

The acquirer 2006, in the more specific example of FIGS. 6 and 7, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on its premises. Each acquirer 2006 will have a relationship with one or more merchants 2004 and will interface with the merchants' terminals 126 via terminal driver 2014 (an acquirer may also act as an acquirer for itself as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. Token based transactions are also considered as enhanced services (value added services). A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 (discussed elsewhere herein) configuration and transactions from that account range are then routed to the port from which the sign-in request is received. A member ID can be present on ports on multiple PNIPs at an Issuer site—see discussion of FIG. 9 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. This is also valid for token based transactions; tokens that fall into specific account ranges are associated with the MasterCard Digital Enablement Service (MDES) and are routed by the payment network (Mastercard Network) to MDES. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. Token based transactions are routed to the Token Service Provider (TSP) (MasterCard's MDES service is a non-limiting example) for token mapping and cryptogram validation. On the other hand, if no special services are required, the message may be routed directly to the issuer PNIP 2024 as seen at 2026. Note that a Token Service Provider (TSP) is defined herein as in the aforementioned EMV® Payment Tokenisation Specification: Technical Framework, Version 1.0; i.e., an entity that provides a token service including a Token Vault and related processing.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050 (discussed elsewhere herein), and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figures 8, 9:
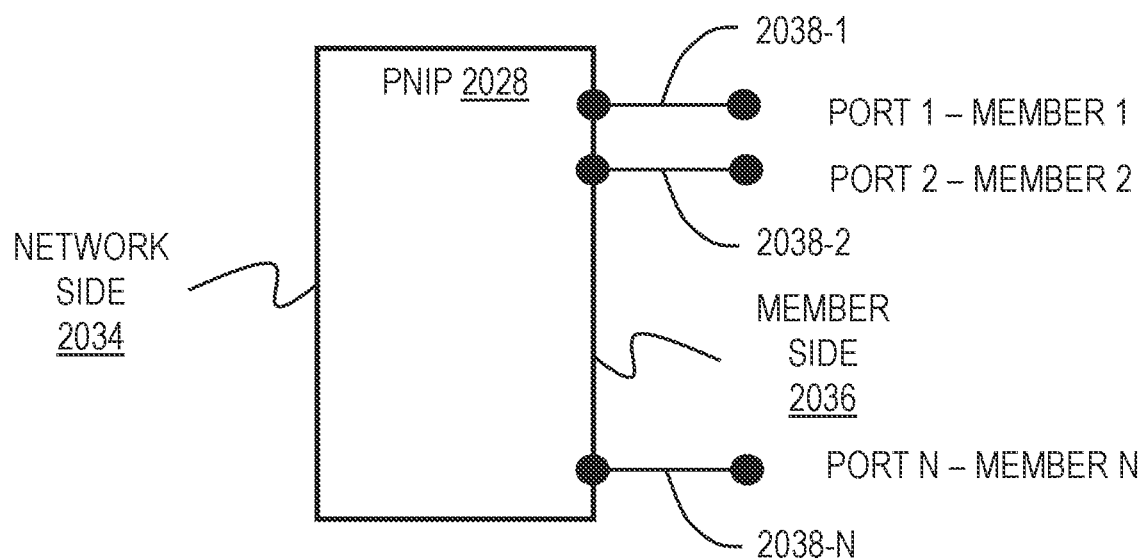
FIG. 8 shows a group of payment network interface processors, such as may be used with the network of FIGS. 6 and 7.
FIG. 9 shows a port arrangement on a payment network interface processor, such as may be used with the network of FIGS. 6 and 7.

FIG. 8 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 8 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 9 where a generalized PNIP 2028 has a network side 2034 and a member side 2036. Member side 2036 has N ports 2038-1 through 2038-N to members 1 to N. N is used herein as a generalized arbitrary integer and the value of N in FIG. 9 is not necessarily the same as that of N in connection with elements 2002 in FIG. 2, for example.

Figure 10:
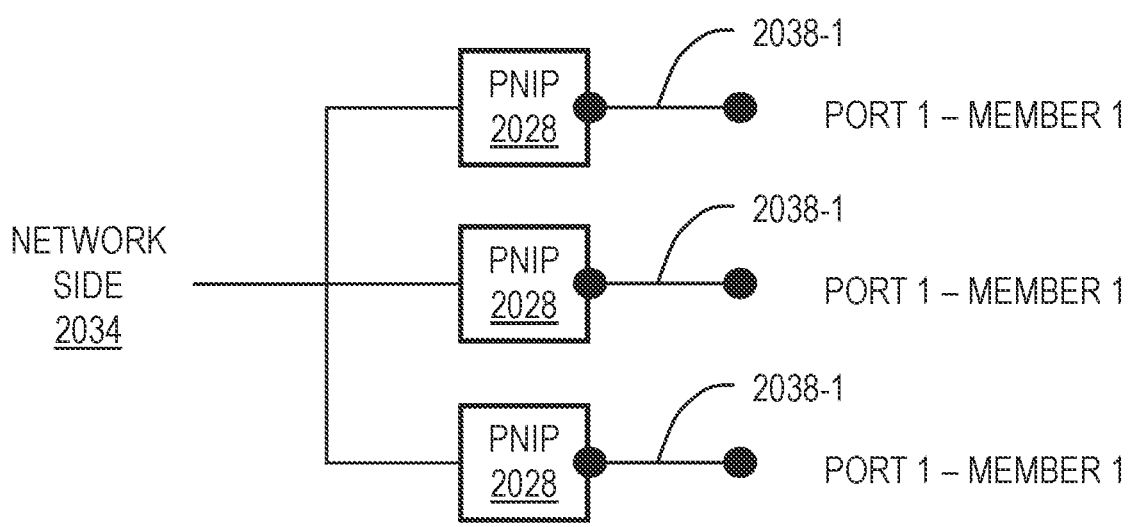
FIG. 10 shows a case wherein an issuer has multiple payment network interface processors.

As seen in FIG. 10, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 9). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 6 and 7 show "MPS extract" 2022, 2044; this will typically include the extract itself and the associated parameter file manager which manages obtaining the extracts from MPS 2018. Similarly, to reduce clutter, FIGS. 6 and 7 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 6 and 7 to avoid clutter.

Messages in case of Enhanced Services: In one or more instances, a special architecture is used to facilitate delivery of enhanced services (the ASP 2050 in FIGS. 6 and 7 is a non-limiting example). Examples of enhanced services include the MasterCard "inControl" product providing spending controls and/or virtual card numbers. Other examples are payment tokenization, loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, TSP (MDES), payment card control and alerts service (MasterCard's IN CONTROL is a non-limiting example), Pay with Rewards, Installments and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

One or more embodiments are applicable to both "pull" and "push" payments; in some instances, a consumer can make a "push" payment using a mobile app. Thus, it is worth noting that, while payment card networks have generally been used as described with regard to FIGS. 1 and 2, recently, MasterCard MONEYSEND (mark of MasterCard International Incorporated, Purchase, N.Y., US) money transfer services have provided a new dimension. A funding transaction moves money from the sender (customer) to the Originating Institution (the financial institution providing the money transfer service); that transaction can be initiated through a MONEYSEND application program interface (API). The sender can fund the transaction using a MasterCard card account or other branded card account that the Originating Institution accepts; from a bank account; or with cash. A Payment Transaction transfers funds from the Originating Institution, via the MasterCard Network (e.g., BANKNET), to the payment card account identified by the recipient at the Receiving Institution. Funds can be transferred to a MasterCard® card, Debit MasterCard® card, and the like (marks of MasterCard International Incorporated, Purchase, N.Y., US). Such transactions are an example of what can be more generally referred to as special payment transactions.

Electronic Bill Presentment and/or Payment Systems and Automated Clearing House (ACH) Payments The process of electronic bill presentment and payment has also been popular for quite some time. For example, U.S. Pat. No. 5,699,528 to Hogan, expressly incorporated herein by reference in its entirety for all purposes, discloses a system and method for bill delivery and payment over a communications network. In the bill delivery and payment system, users are able to access a server computer on a communications network to obtain bill information and pay bills.

Figure 3:
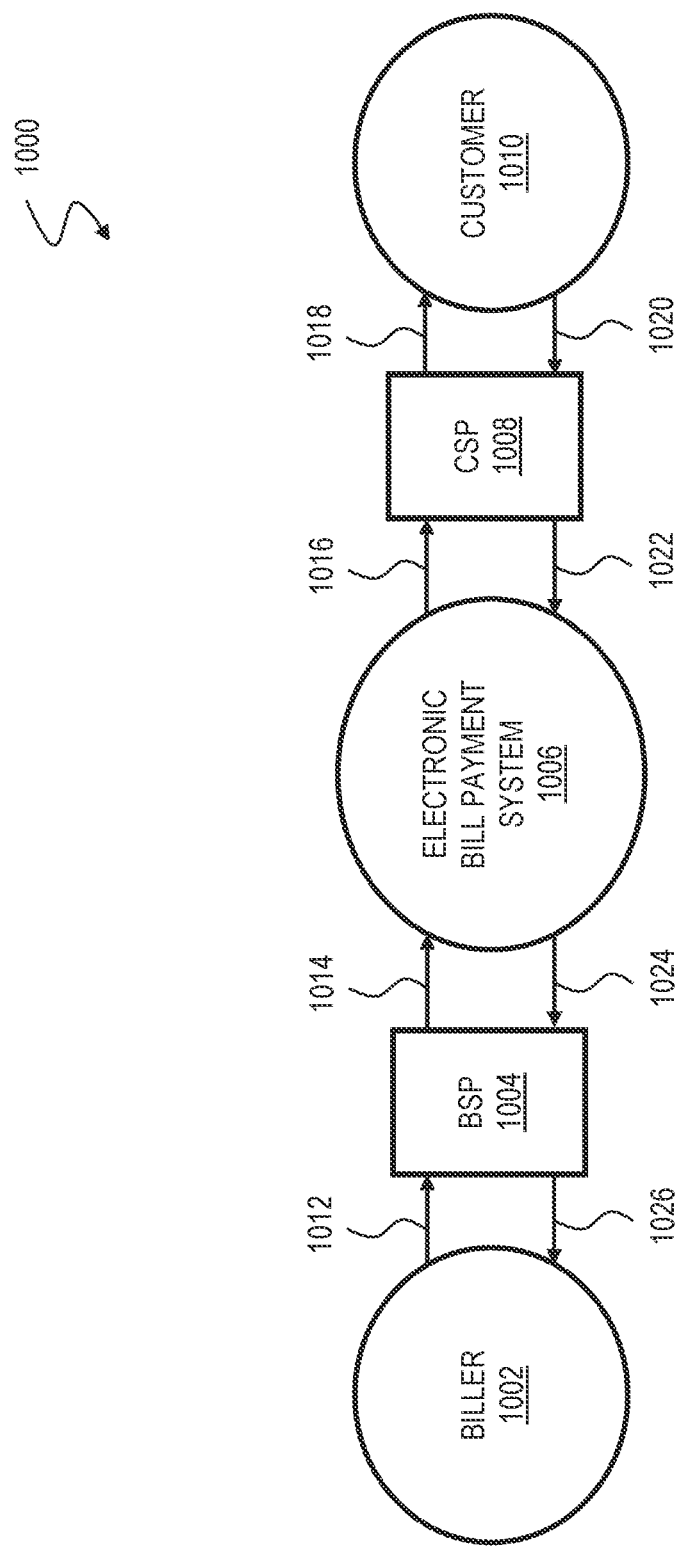
FIG. 3 shows exemplary operation of a bill pay system, as known from the prior art.
Figure 4:
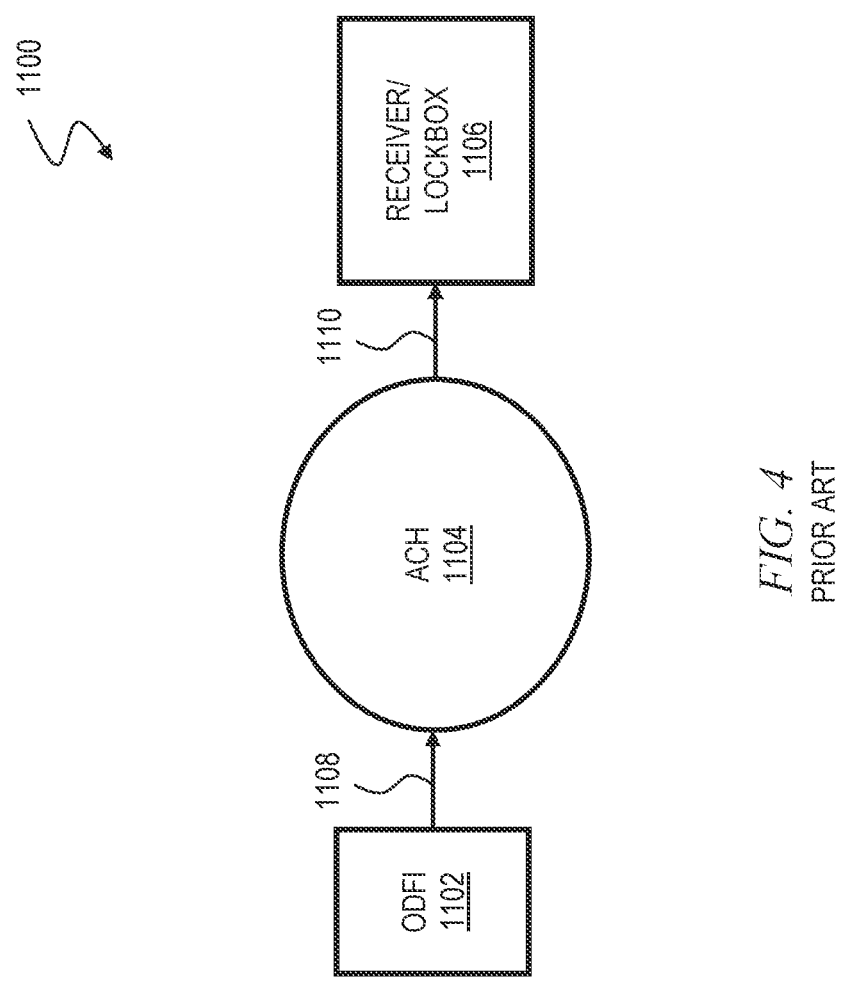
FIG. 4 shows exemplary operation of current automated clearinghouse payments.

Referring now to FIGS. 3 and 4, electronic bill payment systems are conceptually different than payment card networks, and will often use electronic funds transfer from a demand deposit account. In some instances, a single entity, such as MasterCard International Incorporated (a non-limiting example) will operate both a payment card network and an electronic bill payment system (optionally, with presentment functionality).

Electronic bill presentment and payment systems can be used in connection with some embodiments; one example is the MASTERCARD RPPS® electronic payment system of MasterCard International Incorporated of Purchase, N.Y., USA. This example is non-limiting; for example, other types of electronic bill presentment and/or payment systems could be employed in other instances. Non-limiting examples are described in:

US Patent Publication 2011-0251952 A1 of Mary L. Kelly et al., expressly incorporated herein by reference in its entirety for all purposes.

US Patent Publication 2012-0197788 A1 of Hemal Sanghvi et al., expressly incorporated herein by reference in its entirety for all purposes.

US Patent Publication 2013-0290177 A1 of Amy Christine Milam and Stephen Joseph Klaus, expressly incorporated herein by reference in its entirety for all purposes.

US Patent Publication 2013-0311362 A1 of Amy C. Milam et al., expressly incorporated herein by reference in its entirety for all purposes For the avoidance of doubt, references to "MasterCard," "an entity such as MasterCard International Incorporated," and the like, unless expressly stated to be limited to MasterCard, are intended to be exemplary of an operator of an electronic bill payment system (optionally, with presentment functionality), an operator of a payment card network, as will be appreciated by the skilled artisan from the context, whether or not qualified by words such as "or other operator"; in some embodiments, such an entity may also function as a Token Service Provider.

Furthermore, another non-limiting example of an electronic bill presentment and/or payment system is the CHECKFREE platform available from Fiserv, Inc. of Brookfield, Wis., USA. Other possibilities will also be apparent to the skilled artisan, given the teachings herein.

FIG. 3 shows operation of an electronic bill payment system, such as the MASTERCARD RPPS® electronic payment system, which is but one non-limiting example of such a system. As shown in FIG. 3, in an approach 1000, during a presentment phase, a biller 1002 electronically sends billing information 1012 to its biller service provider (BSP) 1004; that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Note that "BPPS" is used herein as shorthand for an electronic "bill presentment and payment system"; the MASTERCARD RPPS system is a non-limiting example of such a system.

Note that in some instances, billers 1002 can connect directly to BPPS 1006 without the use of BSP 1004. In such cases, billers 1002 exchange presentment and payment data directly with BPPS 1006.

FIG. 4 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; non-limiting examples of ACH file formats include the NACHA ACH CIE, NACHA ACH PPD, or NACHA ACH CCD (e.g. for corporate-to-corporate cases) file formats. Other formats can also be used; for example, extensible markup language (XML). It should be noted that a variety of networks can be used, both public (for example, ACH) and proprietary (for example, the aforementioned MASTERCARD RPPS system).

Figure 5:
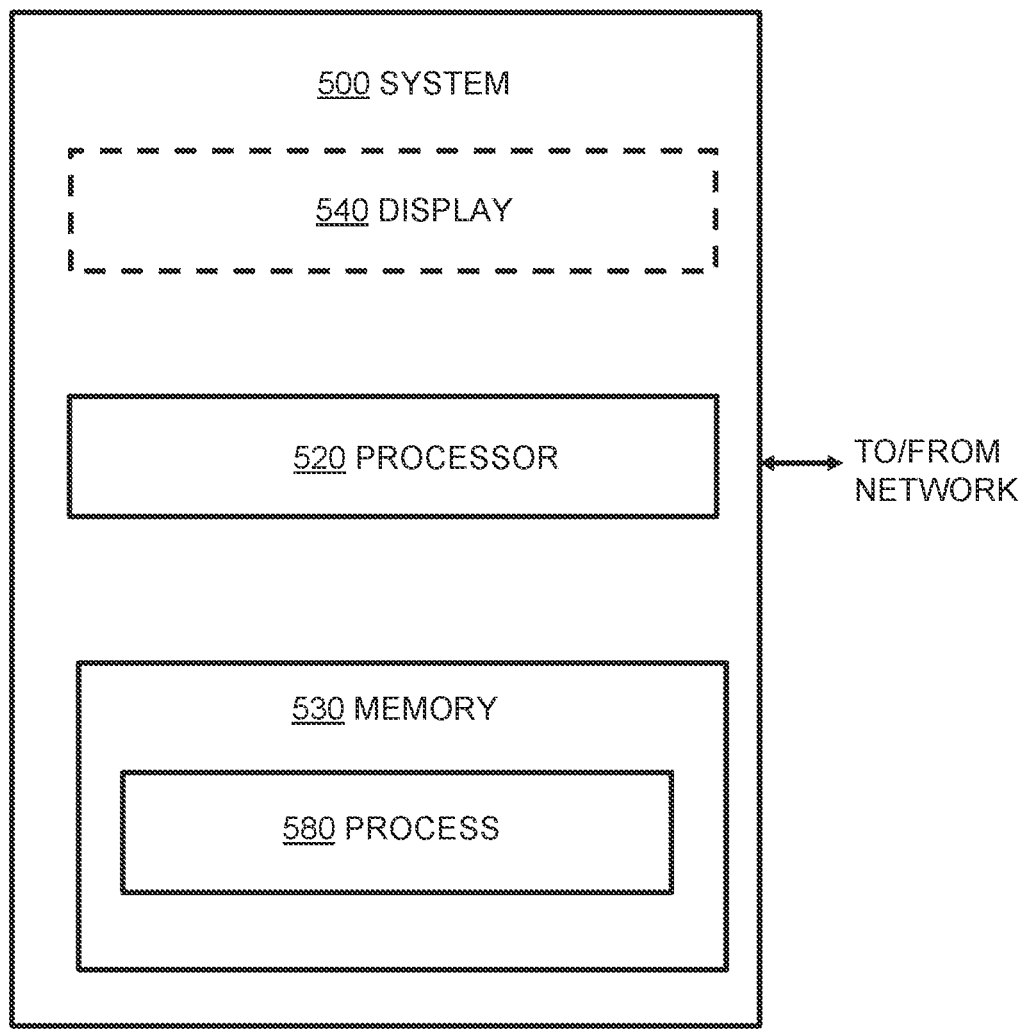
FIG. 5 is a block diagram of an exemplary computer system useful in one or more embodiments of the invention.

As used herein, an "electronic bill presentment system using customer service providers" refers to a system wherein electronic bills are distributed from billers, through an aggregator switch, out to financial institutions or other customer service providers such that those financial institutions or other customer service providers can display the electronic bills, through the financial institutions' or other customer service providers' own on-line banking interface, to bill-paying customers of the financial institutions or other customer service providers. FIG. 5 of the herein-referenced US Patent Publication 2011-0251952 A1 of Mary L. Kelly et al. shows an exemplary block diagram of an electronic bill presentment system, including a bill payment platform and a bill presentment platform; the bill payment platform may utilize techniques disclosed in the herein-referenced US Patent Publication 2012-0197788 A1 of Hemal Sanghvi et al.

Some electronic bill payment systems use the NACHA ACH Standard Entry Class (SEC) formats, such as CIE (Customer Initiated Entries), CTX (Corporate trade exchange); CCD (Cash Concentration or Disbursement); or PPD (Prearranged payment and deposits). Some electronic bill payment systems use a modified form of the NACHA CIE (MOD-CIE) wherein a payment system operator requires specific values for certain fields. Some electronic bill payment systems (e.g., MASTERCARD RPPS) provide translation capability and can receive input in many different formats, translate it for internal use, and translate it again for output in many different formats, which may be the same as or different from the input formats. Some electronic bill payment systems provide customer service providers with the capability to specify when the electronic bill payment system will look to them for payment instructions. Some electronic bill payment systems provide biller service providers with the capability to specify when the electronic bill payment system will initiate payments. FIG. 5 of the herein-referenced US Patent Publication 2012-0197788 A1 of Hemal Sanghvi et al. shows exemplary system interfaces of an electronic bill payment system.

As noted above, electronic bill presentment and payment systems are conceptually different than payment card networks, and will often use electronic funds transfer from a demand deposit account. Nevertheless, some electronic bill presentment and/or payment systems receive and send data over a network such as is shown in FIG. 2, using capability such as MasterCard Global File Transfer (GFT). Furthermore, US Patent Publication 2010-0100480 of Theresa Altman et al., hereby expressly incorporated by reference herein in its entirety for all purposes, describes a system wherein payment of a bill using a payment card account is facilitated by formatting and dispatching a message from a bill payment provider to an electronic bill payment system. The message is flagged with a flag indicating that the message includes a non-financial, card payment, message. The message includes an identification of the biller, a card number of the payment card account, and an expiration date of the payment card account. The message is an electronic funds transfer message augmented with the flag, the card number, and the expiration date.

Some electronic bill payment systems use technology such as described in the herein-referenced US Patent Publication 2013-0290177 A1 of Milam and Klaus to reduce the number of non-electronic payments. Some electronic bill payment systems use technology such as described in the herein-referenced US Patent Publication 2013-0311362 A1 of Amy C. Milam et al. to facilitate approximately matching entered payee information to stored biller information.

ACH is a non-limiting example of Electronic Funds Transfer (EFT); various types of EFT/bank fund transfer techniques are in use in many countries around the world. One or more embodiments employ data analytics on EFT payments; for example, using systems and techniques available from VocaLink, London, UK, a MasterCard company. Non-limiting exemplary data elements that can be used for data analytics purposes on EFT data are set forth below.

Exemplary Mobile Device

Figure 11:
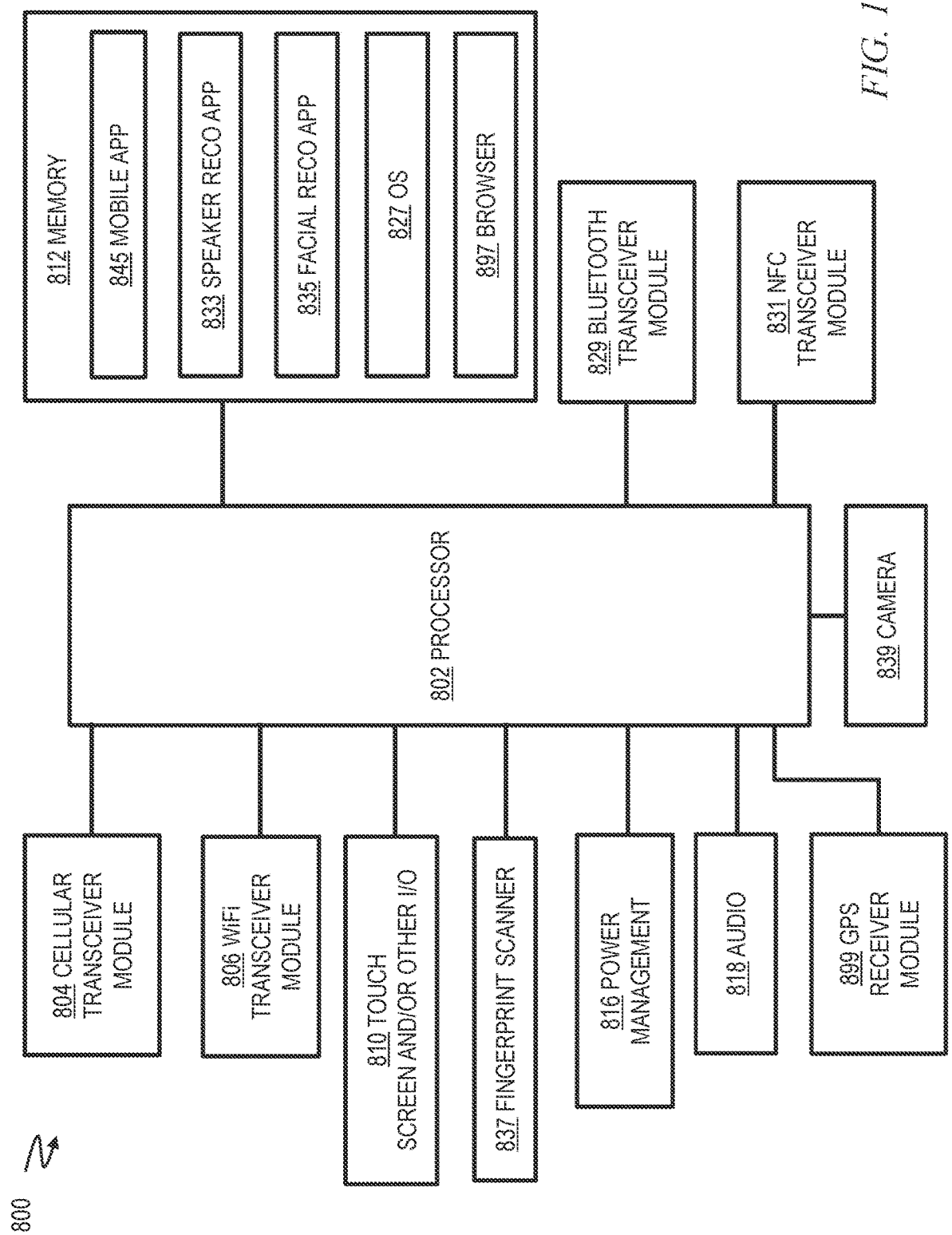
FIG. 11 is a block diagram of a "smart" phone or tablet computer useful in one or more embodiments of the invention.

FIG. 11 is a block diagram of an exemplary tablet computing device, netbook, "Ultrabook" or other subnotebook, laptop, mobile electronic device, or smart phone 800 or the like. Unit 800 includes a suitable processor; e.g., a microprocessor 802. A cellular transceiver module 804 coupled to processor 802 includes an antenna and appropriate circuitry to send and receive cellular telephone signals, e.g., 3G or 4G. In some cases, a Wi-Fi transceiver module 806 coupled to processor 802 includes an antenna and appropriate circuitry to allow unit 800 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 829 coupled to processor 802 includes an antenna and appropriate circuitry to allow unit 800 to connect to other devices via the Bluetooth wireless technology standard. In some cases, an NFC transceiver module 831 coupled to processor 802 includes an antenna and appropriate circuitry to allow unit 800 to establish radio communication via near-field communications.

Operating system (OS) 827 orchestrates the operation of unit 800. Apple's iOS and Google's Android are non-limiting examples of suitable operating systems.

Touch screen 810 coupled to processor 802 is also generally indicative of a variety of input/output (I/O) devices such as a keypad, another type of display, a mouse or other pointing device, and so on, all of which may or may not be present in one or more embodiments. Audio module 818 coupled to processor 802 includes, for example, an audio coder/decoder (codec), speaker, headphone jack, microphone, and so on. Power management system 816 can include a battery charger, an interface to a battery, and so on. Memory 812 is coupled to processor 802. Memory 812 can include, for example, volatile memory such as RAM, and non-volatile memory such as ROM, flash, or any tangible computer-readable recordable storage medium which stores information in a non-transitory manner. Processor 802 will typically also have on-chip memory.

In some cases, fingerprint scanner 837 is coupled to processor 802 for biometric authentication purposes. An appropriate corresponding software application (not separately depicted) may reside in memory 812 in some instances. A digital camera 839 is coupled to processor 802. Camera 839 can optionally be used in conjunction with a facial recognition application 835 in memory 812 for biometric verification. A microphone in audio module 818 can optionally be used in conjunction with a speaker recognition application 833 in memory 812 for biometric verification; a suitable acoustic front end can be provided.

A GPS receiver module 899 coupled to processor 802 includes an antenna and appropriate circuitry to allow device 800 to calculate its position by precisely timing the signals sent by GPS satellites high above the Earth. Corresponding software resides in memory 812.

Memory 812 can also include, for example, a stored PIN for comparison with a PIN entered via touch screen 810; extracted facial features from the legitimate owner of the phone for comparison with facial features extracted from a picture taken by camera 839; extracted fingerprint features from the legitimate owner of the phone for comparison with fingerprint features obtained from a scan carried out by scanner 837; and/or extracted voice features from the legitimate owner of the phone for comparison with voice features extracted from a voice sample obtained from a microphone in audio module 818. Note that elements in FIG. 11 are shown connected directly to processor 802; however, one or more bus structures can be employed in one or more embodiments. Furthermore, elements shown as implemented in software may be implemented at least in part in hardware for speed, if desired.

Browser program 897 in memory 812 deciphers hypertext markup language (html) served out by a server such as system 500 (discussed below) for display on screen 810 or the like.

Application 845 in memory 812 is representative of, for example, a mobile wallet, in-app payments, and the like.

Every instance need not necessarily have every feature depicted in FIG. 11.

Bin-Conserving Tokenization Techniques

One or more embodiments relate to digital payments and lending; for example, aspects include providing personalized offers to consumers for credit and to the issuance of digital consumer credentials for use of the credit in electronic transactions. Consumers want to make digital payments with affordable and flexible financing options. However, applying for loans or credit cards is lengthy, inconvenient and there is the possibility of rejection. Rejection of credit results in the consumer not only being deprived of financing, but also results in a reduced credit score. Additionally, financing and payments are usually done separately; after receiving the loan/card, the consumer has to then digitize the card to make a payment. Moreover, each card scheme and digital payments channel has a different payments user experience, which can be confusing for the consumer, as well as costly and time-consuming for the Issuer to implement. Issuers generally desire to reduce their time-to-market and to increase their return on investment (ROI). One or more embodiments advantageously provide a single solution that can afford consumers a seamless user experience and issuers a more efficient implementation method.

In addition to the above mentioned problems, legacy credit-checking systems, e.g. based on the FICO scoring system, for evaluating credit risk of consumers, are another significant problem for consumers. Each time a consumer requests credit, a credit check is performed using these systems, with a concomitant possibility of rejection. Evaluation criteria are limited to performance with known creditors and single events that may appear for several years in the history of the consumer. Also, these systems are only updated, e.g., every month and may not reflect the current financial state of the consumer. Additionally, performing a credit check itself can take a certain amount of time, and is not very efficient for on-the-fly credit issuance.

Also, consumers want to be able to make both push and pull payments (purchases, send money, pay for bills, etc.) via their consumer devices at their own convenience. One or more embodiments advantageously provide a unified value added services digital platform that enables consumers to make any kind of payment(s) using the credit they have.

One or more embodiments advantageously mitigate the problems stated above and/or introduce an integrated digital lending and payments solution that allows the consumer to receive pre-approved personalized credit offers and/or easily apply for and receive credit that can be used instantly to conduct a transaction. As a result, the consumer will no longer be burdened by carrying a plastic card or physical wallet; the credit will be available via any consumer device that can be used to make seamless payments (purchases, bill payments, money sending, etc.) through any available channel (online, in-app or in-store), and will no longer be concerned about rejection of credit. One or more embodiments are independent on the payment scheme, and therefore only require a single implementation for the Issuer.

WIPO Publication WO2014-027287 discloses the issuance of digital consumer credentials for use in electronic transactions performed on a mobile device. The issuance and usage of the digital credentials is limited to a mobile device, where the consumer enters an activation received from the issuer on a mobile application. The activation code is associated with the mobile device and is employed to enable the usage of the digital credentials on the mobile device. The digital credentials are limited for issuance and usage on a mobile device only and for contactless mobile payments, whereas in one or more embodiments they can be used by any consumer device, including, but not limited to: PCs, laptops, mobile devices, tablets, and wearables; and can be used in any transaction via any available payment channel, including in-app (mobile), online and in-store purchases, as well as payments and money sending/remittances to other parties.

US Patent Publication 2016-0210600 discloses electronic money transfer in real time by means of issuing credit lines. Real-time electronic money transfer with a consumer device is made possible via real-time deposits into a bank or the instant issuance of credit, where a virtual bank card is either generated on the fly or is reloaded with credit. The system includes components for account registration, credit line requesting and approval. Money transfer is possible only within the same bank, whereas in one or more embodiments, money transfer can be made between any bank(s). Also, US Patent Publication 2016-0210600 is limited to money transfer only, whereas one or more embodiments also allow making payments (purchases) online, in-app or in-store.

"PayPal Credit," formerly known as "Bill Me Later," is a service that lets consumers buy now and pay later. It is an instant and reusable credit line without the plastic. PayPal Credit is available as a payment option at thousands of online stores and once linked to the consumer's PayPal account, it can be used almost everywhere PayPal is accepted. There are no account numbers to enter or long credit applications to fill out. PayPal Credit is available within the checkout process. Furthermore, when the consumer links his or her PayPal Credit and PayPal accounts, he or she can use PayPal Credit (and get more time to pay) at most places PayPal is accepted—both offline and online. After the consumer requests credit, if approved, Comenity Capital Bank will extend credit to the consumer for the amount financed to pay for the purchase. Comenity Capital Bank will pay the merchant on the consumer's behalf for the purchase. PayPal Credit does not provide personalized credit offers from the consumer's own bank and is subject to approval. A loan offering is provided by only one bank, which performs a credit check and could hurt the credit score of the consumer if rejected. On the other hand, in one or more embodiments, credit offers are offered from the consumer's own bank, using the data that is already available; therefore, there is no need to perform a credit check at the time of the offer, resulting in approval of the credit.

In one or more embodiments, the consumer device registered into the integrated lending and payments platform for issuance of digital consumer credentials. A consumer device can be any connected electronic device, including a smartphone/mobile device, tablet, PC, laptop, wearable, etc. See, e.g., FIGS. 5 and 11. The registration process includes, in one or more embodiments, verification of the consumer via a unique user ID and password that is provided and verified either by the bank (e.g. for online banking), or another authorized party such as a wallet service provider. The consumer should have at least one valid bank account that can be linked to a digital consumer credential. The consumer may also be requested to provide an activation code that would be provided by the bank or other authorized party to the consumer via a push notification, SMS, e-mail or by the consumer calling the customer service representative (CSR), or the CSR calling the consumer. The consumer may also be required to provide a personal identification number (PIN), passcode, device unlock pattern, biometrics, etc. as a Cardholder Verification Method (CVM). This CVM may be specific to the digital consumer credential or be valid for the wallet or wallet instance. The CVM can be used for validating the consumer during a transaction with the digital consumer credential. Once the consumer is verified, has at least one valid bank account, and has provided a CVM, the consumer is registered within the platform with this information. A registered consumer is then eligible to have digital credentials issued that are linked to the bank account.

One or more embodiments provide a method for the issuance and management of personalized digital consumer credentials, which are generated and stored securely in a digital issuance system. The digital issuance system accepts requests to generate digital consumer credentials from an authorized entity only, e.g. a wallet server, a bank or an authorized third party that was previously authenticated by the digital issuance system. The communications link between the digital issuance system and the authorized entity could be, but is not limited to, an API (REST, SOAP, etc.) using an internet connection or a host-to-host communication (e.g. based on ISO 8583), or any other technique used in payments systems today. The digital consumer credentials are linked to an existing bank account of the consumer and stored securely; e.g., in an encrypted database or Hardware Security Module (HSM). The digital consumer credentials have a unique identifying number, specific to a single consumer. One possible way that the digital consumer credential number can be generated is that the bank provides a Bank Identification Number (BIN) range for the digital consumer credentials to be issued. The digital consumer credential number can then be generated within the BIN range provided by the bank, in the same way that payment (credit, debit, etc.) card numbers are generated today, i.e., the digital credentials start with the assigned BIN range, then followed with a randomly generated number, and having a Luhn parity check number following the random number:

Digital consumer credential primary account number (PAN): BIN range+random number+parity check number.

The digital consumer credential can also have an expiration date, in order to ensure that the credential is not used after a certain period of time. It may also have a verification number that can be used as a security measure, as well as a PAN sequence number (PSN), which is used to specify the instance of the digital consumer credential PAN. Once the digital consumer credential number is generated, the related payment credentials are generated for use during a payment transaction. These payment credentials can include a personalization profile, such as a Europay MasterCard Visa (EMV) profile that includes cryptographic keys that can be used only once or many times to make a payment transaction.

To ensure that only the assigned consumer is allowed to use the payment credentials, the payment credentials can be associated and/or linked with or include the digital consumer credential number, information regarding the consumer device, such as the International Mobile Equipment Identity (IMEI) number (if a mobile device), Mobile Equipment Identifier (MEID), operating system (OS) name and version, device name and/or model, wallet instance/Mobile Payment Application (MPA) Identifier (ID), unique ID of the remote notification system (RNS) used in delivering push notifications to the device (if present/applicable), etc., consumer personal identification number (PIN) or Consumer Device Cardholder Verification Method (CDCVM) data, geolocation, IP address, as well as the transaction count that specifies the number of the payment credential out of a total number that can be delivered into the device. This personalization profile can be specific to the device and multiple personalization profiles can be generated for the same digital consumer credential and delivered into the device. For example, a mobile device can be delivered a contactless EMV (credit) profile and a contactless magnetic stripe profile for in-store payments, in addition to a Universal Cardholder Authentication Field (UCAF) profile that can be used for online payments.

The digital issuance system allows the life cycle management of the digital consumer credentials by the consumer and/or by authorized parties (typically the bank). Life cycle management can include, but is not limited to, adding/deleting/suspending/un-suspending a digital consumer credential. Life cycle management is possible, for example, via accessing the digital issuance system, e.g. with APIs (SOAP, REST, etc.) or a host-to-host communications (e.g. ISO 8583 messaging) link.

In one or more embodiments, the PSN value is employed for life cycle management of the digital consumer credentials as follows. The consumer may desire to use the same digital consumer credential on another device, or digital wallet. The consumer or Customer Service Representative (CSR) may delete the software that stored the existing digital consumer credential, or may delete the digital consumer credential itself from the device or wallet; and the consumer now wants to use the credential again. In both cases, the same token PAN number can be used with new payment credentials and a different PSN value. This is advantageous as compared to the alternative of issuing a new digital consumer credential PAN, which requires the redundant usage of the BIN range.

If the device is lost or stolen, the consumer may request suspension or deletion of the existing digital consumer credential(s) either directly from the device/wallet/MPA or via the CSR, depending on the customer support model implemented/provided by the issuer. Once the digital consumer credential is suspended, it is marked as suspended within the digital issuance system. Additionally, the related payment credentials can also be deleted from or suspended within wallet of the consumer's device. Alternatively the wallet could be terminated, which would result in the deletion of all digital consumer credentials associated with the wallet instance.

One or more embodiments provide a method of delivering the digital consumer credentials into the consumer device. Digital consumer credentials generated by the digital issuance system are delivered into the consumer device via a secure communications link with the credentials delivery system. This link could, for example, be established with an API between the credentials delivery system and the consumer device over an internet connection, where the consumer device and credentials delivery system mutually authenticate each other, e.g. using an internet connection with a Transport Layer Security (TLS) channel or any other PCI compliant internet channel. The consumer device can have appropriate software installed, for example a mobile payment application (MPA), which can include a software development kit (SDK) that establishes the communications link with the credentials delivery system with an internet connection. The digital consumer credentials could be stored within a secure area of the device or MPA in software, e.g. using whitebox cryptography, or in hardware e.g. in a Secure Element (SE) or Trusted Execution Environment (TEE).

One or more embodiments provide a method of assessing the credit worthiness of a consumer, wherein consumer data available from the consumer's device(s), from a bank, from public records, or from any other reliable source may be used. Consumer information may include, but is not limited to, payment history, details on missed or late payments, length of credit history, number of new accounts, spending habits, number of accounts, type and number of different accounts/credit lines, balances in accounts, total credit line, total amount owed, balances on installment loan accounts compared with original loan amounts, mortgage, auto loans, public records, and employment information of the consumer. The consumer data can be used in performing credit checks with a credit assessment system on a regular basis (hourly, daily, weekly, monthly, etc.) or at the time a request for credit is made. The credit assessment system may include consumer data from a single bank, or may contain aggregated data from multiple banks or other authorized third party processors. The credit assessment system may be accessible to banks or to trusted third parties via a secure communications link, which may include Application Programming Interfaces (APIs).

One or more embodiments include a method of providing personalized credit offers to the consumer via a consumer device at the time of payment or at any other time. The consumer data used to provide the offer may include, but is not limited to, the consumer's geo-location (see, e.g., 899) obtained from the consumer device, merchant category, payment amount, time of day, gender, spending habits, etc. The offer may be provided as a push notification to the consumer device, an SMS message, e-mail, etc. For example, suppose the consumer enters an electronics store and only has an account balance of $200, but has a good credit history. The consumer receives an offer via SMS or push notification on the device to make a payment with 6 installments for purchases over $1000 with zero APR from his or her bank. The consumer may then choose to opt-in to obtain installment financing.

In another aspect, suppose that the consumer is shopping online and is at the check-out, and realizes that there are insufficient funds in the account. The consumer receives an offer to buy now and pay one month later before confirming the checkout. The consumer could, for example, select to pay for the purchase a month later by selecting to opt-in with a button on the check-out page and complete the purchase.

One or more embodiments provide a transaction processing system within the integrated lending and payments platform, which is used in the validation of the digital payment credentials. The transaction processing system performs the technical approval of the transaction (cryptographic validation, fraud controls, etc.) and sends the validated message to the bank for the financial approval of the transaction, which is performed by the bank, where for the bank account linked to the digital consumer credential, status (account validity) and limit (sufficient funds exist in account) controls are performed.

One or more embodiments provide a method of sending money from the consumer's bank account using the digital consumer credential to another bank account via a directory service. If the consumer has sufficient funding in the bank account, he or she will be able to send money to another party by, for example, selecting the mobile number or e-mail address from the device's contact list or entering the information manually. The mobile number and/or e-mail address, etc. is used in retrieving the recipient's digital consumer credentials from the digital issuance system's directory. Once the digital consumer credential of the recipient is retrieved, the funds within the sender's bank account are transferred to the bank account of the recipient.

One or more embodiments provide a payment system including the device that contains the digital payment credential discussed above, a transaction processing system discussed above, a merchant system, a merchant point of interaction (POI) i.e., POS terminal, web-site, etc., acquirer/payment gateway, payment network, issuer and a wallet server. For in-store (contactless) and in-app payments, the consumer uses the consumer device to make a payment using the payment credential stored within the device, and may also may be combined with the Cardholder Verification Method (CVM) in generating a session key or cryptogram containing the payment credential (e.g. authorization request cryptogram, or ARQC). For online payments, the payment credentials can be used in generating a cryptogram containing the payment credentials by the wallet server. The cryptogram is sent to the merchant point of interaction (POI) to the acquirer/payment gateway, which sends it to the payment network. The payment network then sends the cryptogram to the digital lending & payments platform's transaction processing system for technical (cryptographic) validation. Once the technical validation is completed, the approved message is sent to the issuer bank for financial approval. Once the issuer performs the financial approval, it sends the response back to the platform. The platform then responds to the payment network, which sends it back to the acquirer and merchant POI.

One or more embodiments advantageously employ digital tools such as smart phones, the Internet, and the like, to provide a new way of consuming financial services. One or more embodiments provide novel and unobvious use cases employing existing tools. Consider that when an individual pays with Apple Pay, the only advanced capability he or she is really using is the biometrics, to authenticate himself or herself on the device. One or more embodiments go beyond this and provide not only digital authentication service but digital financial service. In contrast, current techniques merely replicate usage of a plastic card on a smart phone; they do not really leverage what the smart phone can do better than the plastic card.

Consider the process of digitizing and tokenizing, e.g., MasterCard accounts through the MasterCard Digital Enablement Service (MDES). One or more embodiments move beyond current techniques and create the "card" ab initio in a digital format rather than merely digitizing a plastic card. One or more embodiments do not merely create a card that the consumer can use for payment; rather, the consumer is enabled to do many other things that cannot be done with a plastic card: for example, receiving offers for a loan, performing installments, earning points, and many other value added services.

Currently, MDES works as follows. In essence, you say, "I have this card, and I want to use it on my phone." MDES takes that card number and creates another card number which is an alternative PAN or alternative card number, and links the two. The alternative number is not easily re-created by someone else; there is not an easy one-on-one mapping. There is a secure method of linkage. The consumer uses the alternative card number on his or her phone or other device to make payments. The merchant does not know the actual card number.

In contrast, one or more embodiments reverse the current order: a physical card is not needed to create the token—the token is created first and used that on the individual's phone, possibly without having a plastic card at all (optionally, the bank can issue a plastic card from that token). This aspect also increases efficiency as compared to the present MDES system. Currently, each time an individual seeks to use the alternative number on the device, he or she needs to have a new digital card delivered into the phone. If the token is generated first in accordance with aspects of the invention, however, then the same token can be used on other devices without using up all an excessive number of BINs to create the tokens.

In essence, one or more embodiments liberate the account from the plastic—one or more embodiments create an untraceable token that is provisioned on (potentially many) devices and is supplied to the merchant when a transaction is undertaken; however, the merchant cannot perpetuate fraud with it—only a token service provider can securely link the token to the underlying account.

One or more embodiments can be implemented, for example, by modifying existing MDES functionality in the context of cloud-based payments technology.

In one or more embodiments, the individual has an underlying account such as a bank account; in this way, the bank will know who he or she is and will be able to identify him or her and create the digital card for the individual.

One pertinent advantage of changing the way the token is generated, as per one or more embodiments, is reducing the number of BINs needed. BINs are becoming scarce, especially with current tokenization schemes such MDES—one or more embodiments advantageously reduce the number of tokens created.

Another pertinent advantage is that the token mapping process is simplified; token mapping needs only be performed once for the first token generated and all subsequent tokens can then be mapped automatically to the consumer account, keeping track only of their PSN values. This reduces operational costs and reduces the technical complexity of the system.

One or more embodiments facilitate lending, wherein a bank offers credit to a consumer. One pertinent rationale is that many consumers have digital devices and they want to be able to make payments with those devices and also to be able to afford credit and/or financing. Currently, especially if someone does not have a good credit score/credit history, it is difficult to obtain a loan and/or credit, and the application process is lengthy and inconvenient, most likely involving a trip to the bank and/or filling out a lot of forms. Furthermore, financing and payments are also done separately. For example, currently, an individual may apply for credit and/or a loan, and then once he or she obtains the card, he or she digitizes it into his or her phone, and only after that can he or she use it to make a payment with his or her device. Yet further, there are different card schemes such as VISA, MASTERCARD, AMEX, etc., and each has a different technology and/or user experience, which is very confusing to consumers.

One or more embodiments advantageously provide an integrated, unified way to supply both: (i) the loan and/or card itself and (ii) the issuance and delivery of same into the device so that it can be used to make payments. Heretofore, the consumer first applies for the loan and/or card and then digitizes it into the device to make payments, whereas in one or more embodiments, the consumer applies and instantly receives the card on the phone digitally. One or more embodiments can be used for many different payment card brands and types. One or more embodiments employ a single integration for issuers, which is not just easier from the consumer perspective but also easier for issuers as well. One or more embodiments are easier for consumers in that they provide smart personalized financing offers, using data analytics. One or more embodiments also reduce application rejection rates as the consumer will know if he or she has been preapproved for the loan. In one or more embodiments, getting the card or loan is easier, faster, and more convenient, as it is carried out online on the device rather than by going to a bank and waiting for weeks or manually entering a large amount of information.

Consider electronic wallet solutions such as MasterCard's MASTERPASS® service (registered mark of MasterCard International Incorporated). Many issuers are already using it. There is also a MASTERPASS® wallet that is provided directly by MasterCard, i.e., not implemented by the issuer. MASTERPASS® has a unique offering to consumers where all of the consumer's credentials/cards can be instantly digitized into the wallet. There is no need to enter the card information—the issuer merely pushes all of the available cards into the consumer's wallet so it is very convenient. Because the bank already knows the consumer and because MasterCard has a good deal of data, the data can be used to provide loan offers through the MASTERPASS® wallet. It is worth noting that MASTERPASS® is a Digital Acceptance Brand similar to PAYPAL® (registered mark of PAYPAL, INC., San Jose, Calif., USA), APPLE PAY (registered mark of Apple Inc., Cupertino, Calif., USA), and the like. One difference is that MASTERPASS® uses a network of MASTERPASS®-enabled wallets whereas PAYPAL®, VISA CHECKOUT (registered mark of Visa International Service Association, Foster City, Calif., USA), and the like use a single wallet.

Thus, by way of review, tokenization is a process of replacing a card's primary account number (PAN)—the 16-digit number (or a different length number in some cases) embossed on the front of a plastic card—with a unique alternate card number, or "token." Tokens can be used for mobile point-of-sale transactions, in-app purchases, or online purchases. A token is a numerical value that acts as a substitute for a PAN. In current techniques, a predetermined number of tokens (e.g., up to 50) can be mapped to the PAN, enabling each connected device to have a unique token. MDES is a suite of on-behalf-of services for Issuers that provides end-to-end tokenization of card credentials. These digital services enable a connected device—smartphone, tablet, etc.—to be safer and more secure. Thus, tokenization is the replacement of the card's primary account number (PAN) with an alternative card number that is specific to the device, while digitization is the process that delivers the now 'tokenized' card details to mobile devices or servers, enabling greater safety & security across the payments eco-system. MASTERPASS® is then a non-limiting example of a wallet into which a token can be provisioned using MDES or a similar tokenization service.

Consider a platform such as MasterCard Card Linked Services, which provides, inter alia, personalized card-linked offers, i.e., offers related to a card. For example, if an individual has a platinum MasterCard card, he or she receives specific offers such as 20% off at a certain restaurant. Some embodiments leverage that type of platform to provide other types of offers to the consumer as well. Linkage of that type of platform to novel tokenization techniques is provided in one or more embodiments. For consumers, one or more embodiments not only provide a quick and easy card and/or loan application, they also provide other value-added services using, e.g., an electronic wallet solution by providing card linked financing offers, payment options, installments, and also other value-added services such as card controls (e.g., similar to MasterCard's current In Control™ technology)(mark of MasterCard International Incorporated). For example, it is possible to control whether the card is used online, in a store, internationally, in specific countries, for specific amounts, and so on. In one or more embodiments, the consumer has the benefit of all these value-added services that are not available with a mere plastic card. MASTERPASS® wallets already have some such functionality—can benefit from those assets that MasterCard has and enhance them.

Modern electronic wallets such as MasterCard's MASTERPASS® allow payments in-store, on-line, and in-app. Similar offerings can be provided using a digital issuance platform in accordance with aspects of the invention. The user can make payments anywhere he or she desires—for example, go to a store and pay contactlessly; go online and buy something using a web browser; receive personalized finance offers and flexible payment options (for example when the individual is in a store). In the latter case, Bluetooth technology or the like can be employed. Suppose a subject enters a store and wants to buy an expensive liquid crystal display (LCD) screen. Communication with the subject's smart phone is initiated using electronic beacon technology. A non-limiting example is the Apple "iBeacon" protocol. Various vendors make iBeacon-compatible hardware transmitters, which are a class of Bluetooth low energy (BLE) devices that broadcast their identifier to nearby portable electronic devices. The technology enables smartphones, tablets and other devices to perform actions when in close proximity to a beacon. The iBeacon protocol is based on Bluetooth low energy proximity sensing by transmitting a universally unique identifier picked up by a compatible app or operating system. The identifier and several bytes sent with it can be used to determine the device's physical location, track customers, or trigger a location-based action on the device such as a check-in on social media or a push notification.

Accordingly, in one or more embodiments, a subject can instantly receive an offer in the store—for example, he or she may pay in installments, if he or she purchases with the MASTERPASS® wallet. Other value-added services can also be employed; for example, IN CONTROL technology to apply card controls (or Spend Controls and Spend Alerts platform).

One or more embodiments do not digitize a plastic card; the individual just applies for a loan and/or card in his or her app and/or online, and then he or she accepts the terms and conditions and if the platform accepts the application, communicating with the issuer as well, then the token is activated into his or her phone and he or she can make payments with it.

Thus, previously, smart phones and MDES or other tokenization platforms did not exist. There were only plastic cards, check, and cash. Heretofore, the evolving technology has only adapted to the existing payment paradigms but has not fundamentally changed how things work.

Aspects of the invention thus provide an enhanced tokenization process; wherein the token is provisioned right on the device without the need to instantiate a physical card. One or more embodiments optionally provide additional benefits such as generating offers, giving instant credit, and/or allowing installment payments.

Some embodiments make use of electronic fund transfer (EFT) data analytics; e.g. data analytics from automated clearing house (ACH) in the US, Bankers' Automated Clearing Services (BACS) in the UK, and the like in other countries. Note that ACH-based data analytics is a non-limiting example of EFT-based data analytics and one or more embodiments are not limited to any specific country's EFT system. One or more embodiments leverage ACH or other EFT data analytics in providing lending offers. An entity such as MasterCard International Incorporated analyzes the consumer's credit more comprehensively due to ability to access the ACH or other EFT data. Analytics are this carried out on the consumer's use of EFT data-payments from a demand deposit account (DDA). Data elements that could be used for data analytics purposes include, but are not limited to, Customer ID
Action code
Transaction amount
Transaction code
Transaction currency
Transaction date
Transaction ID
Transaction type
Transaction flag
Originating institution
Originator name
Originator account number
Originator bank code
Originator sort code/routing number/SWIFT code or the like
Receiver name
Receiver account number
Receiving bank code
Receiver sort code/routing number/SWIFT code or the like
Receiving institution
Reason code
Status Heretofore, entities such as issuers have typically only had access to credit scores from a subject's credit history using credit cards. Such a score is also local in nature. So, for example, in the US an issuer or the like cannot leverage any credit history outside of the US. If a person is living somewhere else and moves to the US, no credit information will typically be available on that person. In one or more embodiments, using this (international/global) EFT data, that information can indeed be leveraged. An entity such as an issuer or the like will have the data analytics of the person in another country and this EFT data analytics will provide insight on the consumer's income, since payroll is typically sent to the person's account as EFT. In one or more embodiments, EFT data analytics also provides information such as recurring bill payments, and incoming and outgoing spending as well.

In one or more embodiments, an entity such as MasterCard International Incorporated consolidates this information with existing credit history (locally) available to the entity internally (e.g., MasterCard Advanced Analytics or the like) or externally (e.g., publicly as a FICO score or the like), thereby providing a more comprehensive view to the issuer who wants to provide the service—the issuer will now have access to the global data history of the consumer. Because of this the issuer can better analyze which "bucket" (category of creditworthiness) to put the consumer in. If the consumer has a lot of travel expenses, it may be appropriate to provide an offer for a travel card; if the consumer does a lot of grocery shopping, it may be appropriate to provide a cash back card. The issuer will be better able to analyze the consumer based on this data. Suppose the consumer does not have a card at present and the consumer goes into a store with his or her cell phone and the consumer has Bluetooth enabled on the phone and the store has Bluetooth technology such as iBeacon. The merchant may want to provide a promotion on a product—the consumer, who may have a bank account with a certain issuer, may receive a credit offer at that time to make a purchase for a certain product up to a certain price. The consumer can receive this offer through his or her phone.

When offers or the like are based on analytics performed on payment card transaction data, examples of potentially pertinent data elements include date and time of purchase; an anonymized account number and/or cardholder's (inferred) city and postal code; card type; merchant name, address, and location; merchant category code (MCC); channel (e.g., online versus brick and mortar); transaction type (purchase, return, cash withdrawal, etc.); whether domestic or international; amount; and the like.

In addition to this, in some embodiments, other information available to the mobile device or wearable sensors, etc. can be used; e.g., heart rate, number of steps, calories burned, hours slept, event calendar, etc. All of this information can be used to provide a better, more personalized offer. For example, suppose the consumer is running and his or her heart rate is elevated. Based on that heart rate, assume the consumer is thirsty; provide an offer for a drink at Starbucks when the consumer passes by Starbucks—the location of the consumer is known (subject, of course, to opt-in or other appropriate privacy protections).

Figure 12:
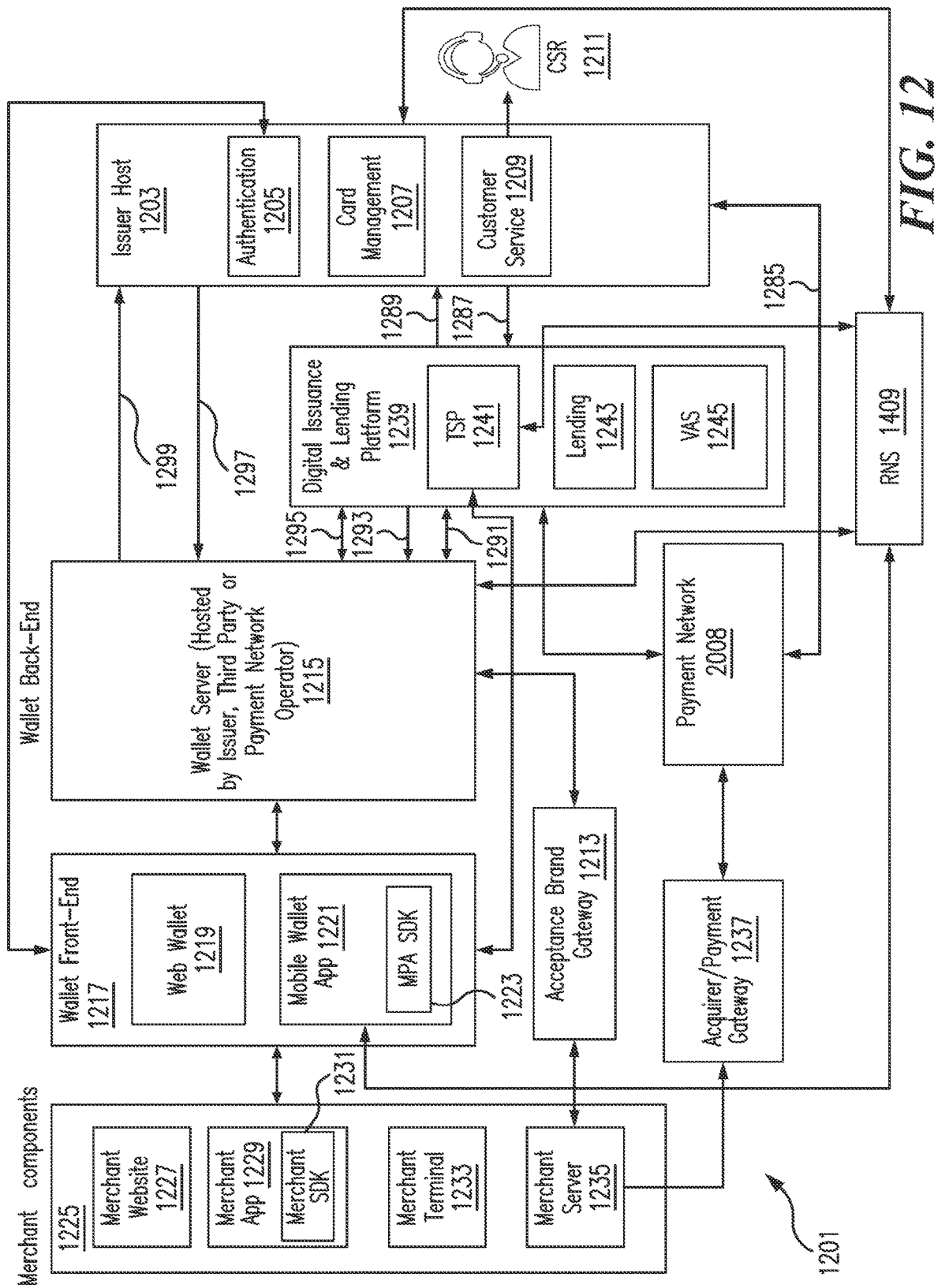
FIG. 12 depicts an exemplary solution architecture, according to an aspect of the invention.

Reference should now be had to FIG. 12 which summarizes the system architecture 1201. Please note that connectors in FIG. 12 that cross at right angles are not intended to imply connectivity; for example, the connector between RNS 1409 and TSP 1241 crosses the connector 1285 between payment network 2008 and issuer host 1203; this is not intended to require connectivity of RNS 1409 and/or TSP 1241 with payment network 2008 and/or issuer host 1203. The main components in FIG. 12 include an issuer system (issuer host 1203) which in turn has an authentication system 1205, a card management system 1207, a customer service system 1209 (providing customer service, for example, via customer service representative (CSR) 1211), and the like. Please note that there can be multiple issuers, merchant systems and TSPs. The wallet server is optional and can be part of an issuer system or TSP. Furthermore, element 1213 is optional, and could alternatively be a PSP or there could be a direct connection between the wallet server and the merchant server. Also included is an acceptance brand gateway/server 1213 (MasterCard MASTERPASS® switch is a non-limiting example) to provide the communications between the wallet server and the merchant server in providing checkout data, such as card information, shipping address, consumer information, etc.; the acceptance brand server may be in communication with a wallet server 1215. Alternatively, the merchant server and wallet server could communicate directly. The wallet server 1215 can be hosted by the issuer, can be hosted by a third party on behalf of the issuer, could be hosted by a third party digital wallet service provider, or could be hosted by an entity such as MasterCard International Incorporated. Alternatively, the wallet server could be part of another system, such as the TSP 1241 or issuer host 1203. System architecture 1201 also includes a wallet client (front end 1217) such as a web-based wallet 1219 or a mobile wallet app 1221. The wallet client could be connected to a wallet server (e.g. for wallet lifecycle management, transaction management, card management, VAS, notifications, etc.), TSP(s) (e.g. for token lifecycle management, notifications) and Issuer Host(s) directly (e.g. for ID&V and notification purposes). The wallet app 1221 will further include an SDK 1223 provided by an entity such as MasterCard International Incorporated. In one or more embodiments, given the teachings herein, the skilled artisan will be able to leverage the existing SDK technology. For example, for MasterCard Cloud Based Payments, MasterCard International Incorporated currently has an SDK called "mobile payment SDK," which is used for both contactless and in-app payments. MasterCard International Incorporated also has a separate SDK for the MASTERPASS® digital wallet or online payments—this is called the "wallet checkout SDK." The skilled artisan will be familiar with these two MasterCard SDKs and similar SDKs available from others, and will be able to adapt same to implement one or more embodiments, given the teachings herein.

The system architecture 1201 further includes a merchant aspect 1225 such as:
  a merchant web site 1227 for an online transaction
  a merchant app 1229 if the consumer is making a purchase through an app—the merchant app will include a merchant SDK 1231 in order to communicate with the MASTERPASS® mobile wallet application such as the MASTERPASS® MERCHANT SDK currently available from MasterCard International Incorporated.
  if an in-store payment, a merchant terminal 1233 such as a contactless point-of-sale (POS) terminal or a QR code reader
  a merchant server 1235 that manages the web site, terminal(s), app, etc. This merchant server could be connected to either the acceptance brand server/gateway, e.g. MASTERPASS® switch 1213 for MASTERPASS® payments, payment service provider (PSP), wallet server, or TSP directly, and is also coupled to the acquirer/payment gateway 1237; the MASTERPASS® switch is a non-limiting example of a Digital Acceptance Gateway that allows the user, when he or she clicks the Digital Acceptance Button at an online merchant/app, to be directed to his or her wallet.

The system architecture 1201 still further includes a payment network (BANKNET or the like as per 2008 is a non-limiting example) and a digital issuance and lending platform 1239; the latter incorporates aspects of the disclosure described herein. In a non-limiting example, digital issuance and lending platform 1239 is implemented by modifying an existing token service provider (TSP) 1241 system such as the MasterCard MDES system as described herein. Platform 1239 also includes a lending system 1243 which generates offers; other existing MasterCard assets or similar systems can also be leveraged (with appropriate modifications as will be apparent from the description herein) such as value-added services (VAS) 1245 (MSSP (MasterCard shared services platform) is a non-limiting example). Such a platform provides value-added services such as pay with rewards, IN CONTROL or similar functionality, installments, card-linked offers, and the like. The skilled artisan will be familiar with similar platforms from other sources as well.

Please note that VAS=value-added services; ID&V=identification and verification; SDK=software development kit; and CSR=customer service representative.

Still referring to FIG. 12, arrow 1299 represents authentication (ID&V), provisioning, and notification; arrow 1297 represents wallet life cycle and user data update; arrow 1295 represents digital token issuance, digitization, remote transaction management (in app payments); arrow 1293 represents a card and/or loan offer; arrow 1291 represents value-added services such as card controls, PWR (pay with rewards), and installments; arrow 1289 represents pre-digitization and token notification; and arrow 1287 represents customer service. Furthermore, arrow 1285 represents authorization, clearing, and settlement. Note the Remote Notification Service (RNS) component 1409; the RNS is responsible for sending push notifications to the MPA. The arrow between the wallet client 1221 and issuer host 1203 indicates a data flow that can be used for ID&B (authentication), bank services and notification, in the case the wallet server does not manage authentication and sending push notifications. The arrow between the TSP 1241 and wallet client 1221 represents digitization (SUK or SK replenishment, etc.). The arrow between the digital issuance platform 1239 and payment network 2008 represents token mapping during authorization and clearing, transaction detail notification and pre-digitization.

In one or more embodiments, the merchant has a contactless-enabled POS terminal to support contactless payments and a merchant website for online payments compliant with MasterCard (MDES/MCBP/Masterpass) specifications (MDES=Mastercard Digital Enablement System; MCBP=MasterCard cloud-based payments; MP SDK=Mobile Payment SDK).

As the skilled artisan will appreciate from, for example, the above-mentioned document "EMV® Payment Tokenisation Specification: Technical Framework," currently, systems such as MDES first digitize an existing physical card. In an embodiment of the disclosure, a token (digital card) is generated first by linking it directly with the consumer's account number (bank account), or the issuer can still issue a physical card and link it to the token. One or more embodiments only issue a physical card if needed. There does not necessarily have to be a physical card. In one or more embodiments, the token has a similar format and structure as in the document "EMV® Payment Tokenisation Specification: Technical Framework," except as described herein. One or more embodiments do not rely on a physical card in order to generate the token. One pertinent difference of one or more embodiments from the prior at is thus that heretofore, for a single physical card there are multiple tokens issued for each device; i.e., there will be a different token for each device even if the same physical card is being tokenized. In contrast, in one or more embodiments, there is only one token per card but different instances have a different serial number like physical cards do—this is called the PSN (PAN Sequence Number; PAN=primary account number).

Thus, in one or more embodiments, there is a single digital card number (token) across multiple devices but there are different PSN values associated with that token. It is also possible to have different token CVC2 (or other card security code) and expiry date values. Currently, with a physical card, when a single card expires and reissues the cardholder can still have the same card number—only the PSN, expiry date and CVC2 value will differ. This is, in effect, the PSN value is like a counter counting which card has been issued; e.g., first card has a counter of 1; the second card issued is number 2. Adapting this aspect to tokenization is why fewer BINs are needed in embodiments of the disclosure as compared to the prior art.

In an existing MDES system or similar system, the second step is that the issuer approves, requires additional verification of the consumer, or declines the digitization request. If the request is approved, a mapping is created between the physical card and the token (FPAN (funding PAN) to DPAN (device PAN)). This mapping is stored within MDES and MDES then uses this mapping any time a transaction occurs during the authorization. Furthermore, in current MDES techniques, all tokens (DPANs) are also being linked with a payment account reference (PAR) that is associated with the FPAN. Each time the consumer has a different device, he or she must digitize a new token for that device, and perform token mapping. Furthermore, for contactless or in-app payments he or she also receives single use keys or session keys (SUKs/SKs) into the device so that he or she can make payments. In case of a device only using a web wallet, SUKs/SKs might not be delivered to the device, in which case cryptogram generation could be performed by MDES at time of transaction instead of the device. Delivery of SUKs/SKs into the device using a web wallet can also be supported in one or more embodiments.

In contrast, in one or more embodiments, first generate the token and then link it with a physical card or the bank account directly. The issuer still typically approves or declines. Then, depending on what the issuer wants to provide (e.g., depending on the lending offer), a debit or credit card can be issued, for example. A mapping is still created between the token and the bank account or physical card; linkage with a PAR is still possible, although not necessary, as this is adds a redundant step. In one or more embodiments, each device is issued the same token number but a different PSN value, expiry date and CVC2 value. SUKs/SKs are delivered as before.

Thus, in one or more embodiments, a single token number is utilized on a number of different devices but is differentiated using different PAN sequence numbers. Optionally, data analytics are used for providing offers.

Figure 13:
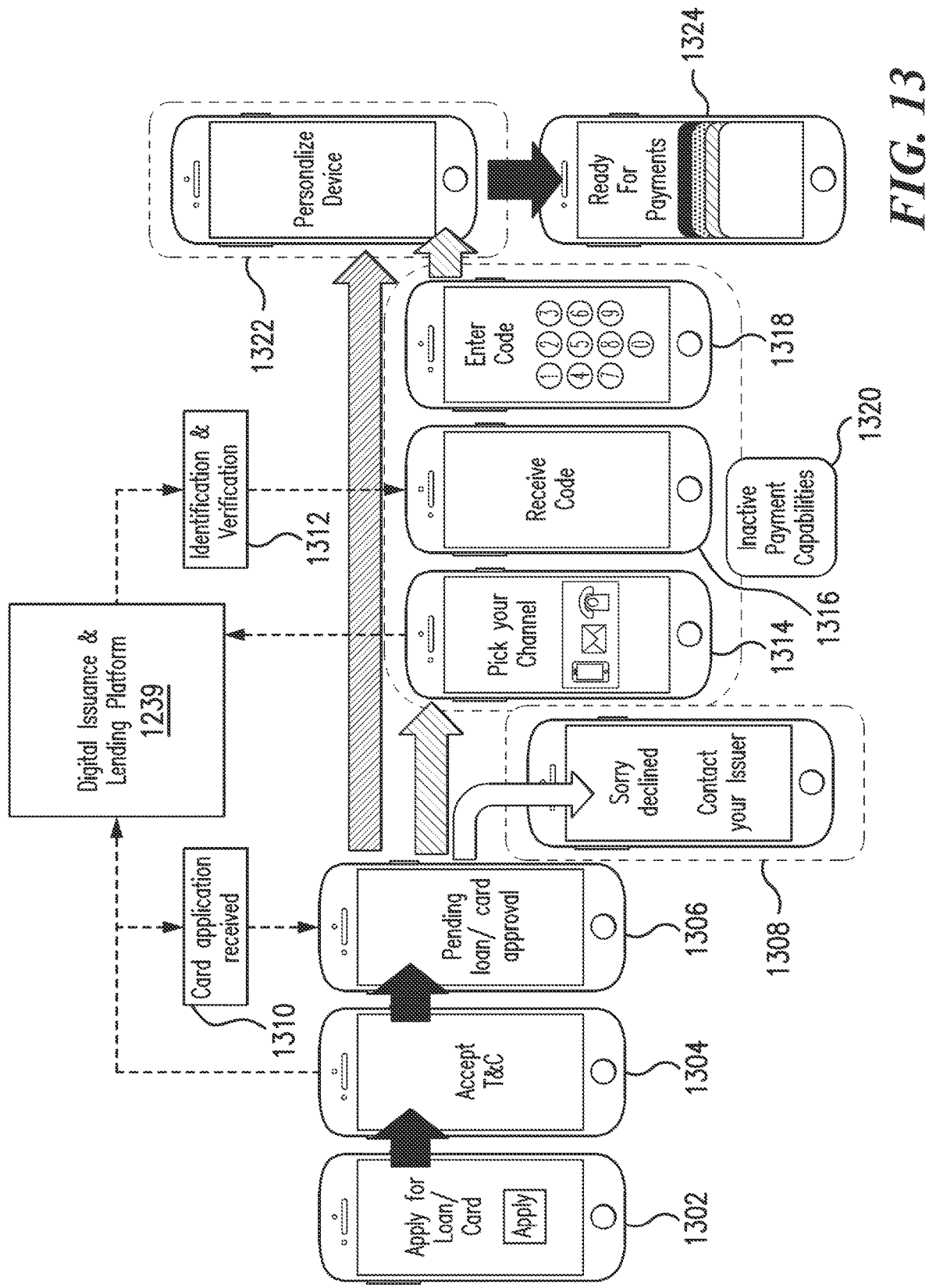
FIG. 13 depicts an exemplary user experience, according to an aspect of the invention.

Referring now to FIG. 13, at 1302, a user employs his or her smart phone to apply for a loan and/or a card account (which may or may not ultimately have a physical cad associated with it). For example, assuming that the user has already authenticated himself/herself by logging into the digital wallet (using e.g. online banking credentials such as a username and password, or credentials specific to the wallet, etc.), the user may be provided with an "apply" button on the phone screen to begin the process. In step 1304, the user accepts the relevant terms and conditions (T&C). This acceptance is communicated to the digital issuance & lending platform 1239. As indicated at 1310, the platform advises the user that the card account (or loan) application has been received; the status is then "pending loan/card account approval" as indicated at 1306. In cases where the application is believed to be acceptable and no further security is to be implemented, processing proceeds directly to the "personalize device" step 1322; when this is complete, the device is ready for payments as at 1324.

On the other hand, if the application is not believed to be acceptable, the user is advised that the application has been declined at 1308 and advised to contact his or her issuer.

In cases where the application is believed to be acceptable but further security is to be implemented, processing proceeds to the "pick your channel" step 1314 wherein the user is given the choice of how to obtain a security code; e.g., as a text to his or her phone via SMS, e-mail, "snail mail," or via voice telephony. The choice is communicated to the platform 1239. Platform 1239 then implements identification and verification as shown at 1312. The consumer would then receive an activation code, which could be sent over the air to the consumer using either the bank or consumer selected channel as seen at 1316. The user then enters the code on the keypad in 1318. Entering an activation code is optional, based on the issuer preference. Alternatively, the wallet client could allow automatically populating of the activation code without requiring the consumer to enter it. During steps 1314, 1316, 1318, as seen at 1320, the payment capabilities are inactive. After the activation code is provided at 1318, if entered correctly, proceed to step 1322, and personalize the device, which is then ready for payments at 1324.

Figure 14A:
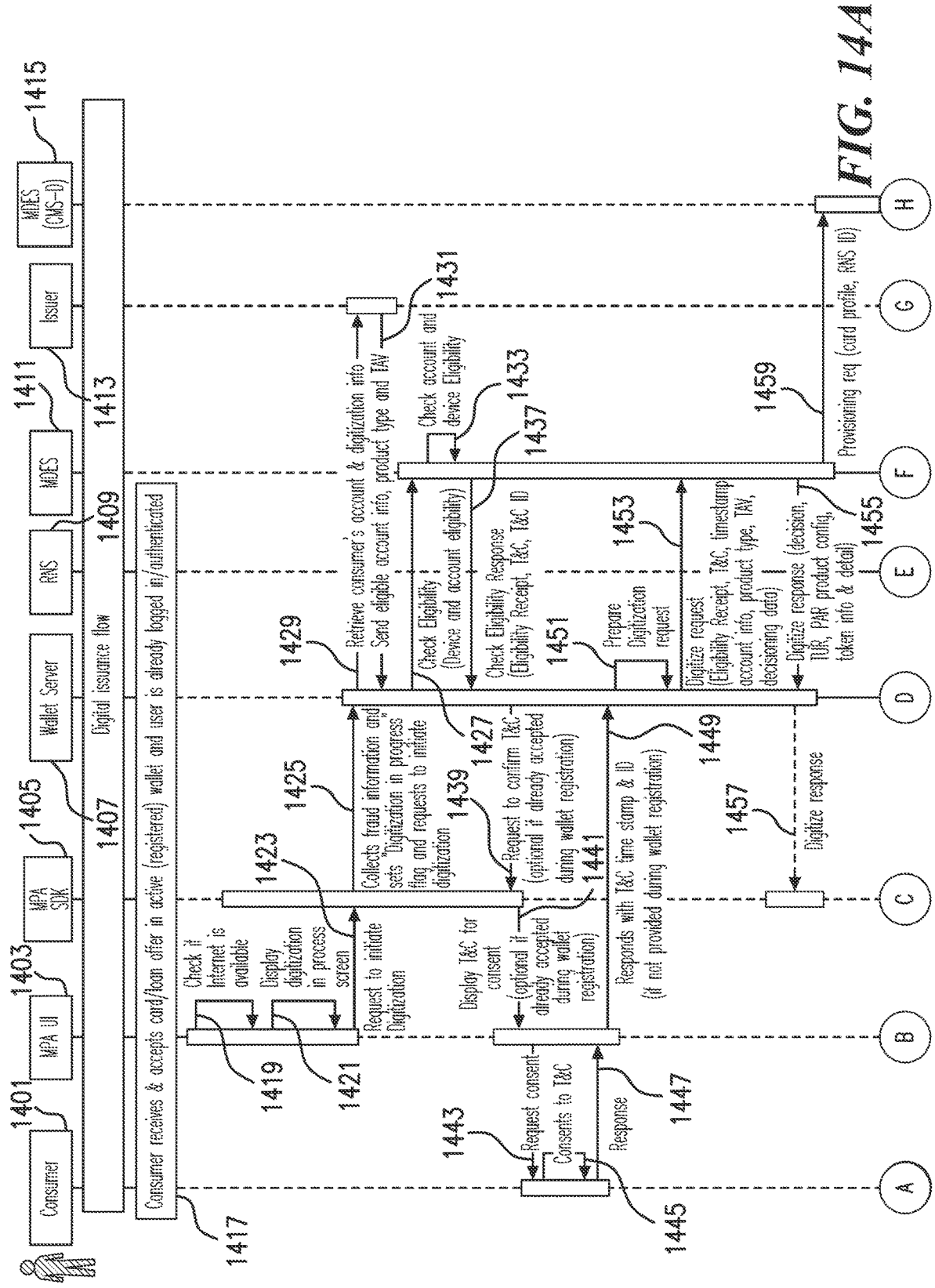
FIGS. 14A and 14B depict an exemplary flow diagram for issuance of digital tokens, according to an aspect of the invention.
Figure 14B:
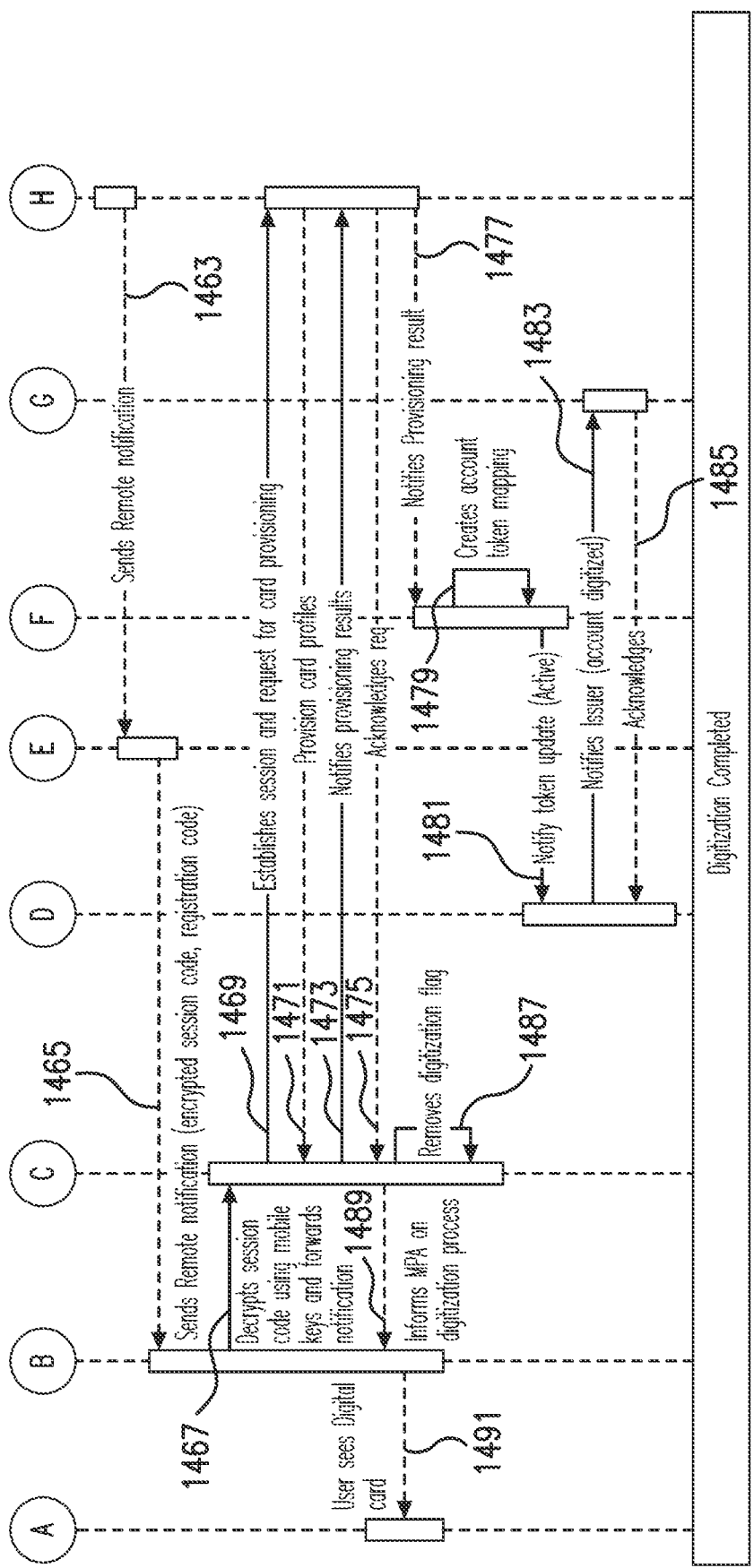

Referring now to FIGS. 14A and 14B (collectively, FIG. 14), pertinent entities include consumer/cardholder 1401; mobile payment application (MPA) (assuming an app is being employed) including MPA user interface (UI) 1403 and MPA SDK 1405; wallet server 1407 (MPA SDK 1405 facilitates communication with 1407); RNS (remote notification service) 1409; MDES 1411; issuer 1413; and MDES (CMS-D) 1415 (CMS-D=credential management system dedicated for that particular issuer 1413). Note that element 1403 is the UI of element 1221, element 1405 is equivalent to element 1223, element 1407 is equivalent to element 1215, element 1411 is equivalent to element 1241, element 1413 is equivalent to element 1203, and element 1415 could reside, e.g., inside elements 1241 or 1215.

In one or more embodiments, MDES 1411 is hosted by an entity such as MasterCard International Incorporated and issuer 1413 connects to it with some application program interfaces (APIs) for customer service; the special component 1415 is dedicated to the issuer.

Referring to 1417, suppose the consumer 1401 receives and accepts the card or loan offer; he or she clicks on accept; the mobile app's SDK 1405 communicates with the wallet server 1407 to initiate digitization, as at 1423, 1425; the wallet server 1407 communicates with MDES 1411 as at 1427, and asks whether the device and account are eligible for digitization. Optional steps include MPA UI 1403 checking if Internet connectivity is available, as at 1419, and displaying a "digitization in progress" screen, as at 1421. Regarding the eligibility check, wallet server 1407 may query issuer 1413, as at 1429, and receive response 1431. Responsive to query 1427, MDES 1411 may check account and device eligibility, as at 1433. It should be noted that in one or more embodiments, instead of checking the eligibility of a card, the consumer's account is checked for digitization eligibility instead. In such embodiments, the issuer provides a Tokenization Authentication Value (TAV) to pre-approve the digitization and specify the product (credit, debit, etc.) type of the token to be digitized.

Assuming the consumer 1401 is already known to the issuer and the account information has been received from the issuer before and the consumer has authenticated himself/herself against either the issuer or the wallet service provider; i.e., before the sequence of steps in FIG. 14, the issuer 1413 registers this consumer 1401 with all of the account information and the consumer authentication is performed. MDES 1411 runs a check at 1433 and if the check passes, MDES 1411 responds to the wallet server 1407 at 1437, providing an eligibility receipt, terms and conditions, in a manner similar to current practice. Then, as at 1439, 1441, 1443, 1445 the consumer 1401 accepts the Terms and Conditions in the case of a new wallet (alternatively, as in 1439, 1441 the terms and conditions may be suppressed if the consumer already has the issuer's banking app or wallet service provider's app and the issuer/wallet service provider already provided its own terms and conditions that include digitization terms & conditions).

It is worth noting that the process in FIG. 14 is exemplary and other embodiments may differ. For example, currently MDES provides its own terms and conditions but issuers/wallet service providers can also have their own terms and conditions—the exact approach to be taken can be optional and/or configurable depending on the facts and circumstances. Another example is that instead of pre-approving digitization for a specific consumer, the issuer may want to be asked to authorize each time a new digital account is to be generated, and may also ask for the consumer to provide additional verification information, such as an activation code. The activation code could be sent as a One-Time Password (OTP) code via Short Message Service (SMS, also known as a text message), email or the consumer may be requested to call the issuer's customer service representative (CSR). The consumer may be required to manually enter the activation code on the wallet UI, or the same could be automatically populated/entered by the device once received. The activation code could be required either for the first digitization only or for each new digitization event.

Assuming that the device is eligible and the consumer accepted the terms and conditions (see consumer response 1447 to MPA UI 1403), the MPA UI 1403 responds to the wallet server 1407 with a terms and conditions time stamp and identifier, as at 1449 (assuming that terms and conditions were not suppressed due to previous acceptance). As seen at 1451, the wallet server 1407 prepares a digitization request, which is dispatched to MDES 1411 at 1453. MDES 1411 responds at 1455, which response is relayed by wallet server 1407 to MPA SDK 1405 at 1457. A provisioning request is sent from MDES 1411 to MDES (CMS-D) 1415 at 1459.

Please note that the encircled "A" through "H" in FIGS. 14A and 14B mark points of continuity between the two figures and do not indicate the same continuity points as the encircled letters "A," "B," "C," "E," and "F" in FIGS. 6 and 7.

Assuming that digitization is to go forward, start provisioning of the "card" at 1459 with remote notification sent from MDES (CMS-D) 1415 to RNS 1409 at 1463. Note that in one or more embodiments, the card profile, whether credit or debit, etc., are known. Note also that RNS=remote notification service which helps to communicate with the mobile application UI 1403. This functionality is used, in one or more embodiments, in sending push notifications (see 1465) to the consumer's device so that it can communicate with other external systems like MDES 1411, the wallet server 1407, the issuer 1413, and the like. For example, the RNS ID can be provided such that it is known who to connect with. The MDES CMS-D 1415 thus sends a push notification at 1463 which is relayed at 1465 together with a registration code.

Note that FIG. 14A, to avoid clutter, only depicts a "green" path; i.e., where the issuer does not require any additional authentication. A "yellow" case is also possible wherein the issuer does require additional authentication; in such a case, the consumer can be required to enter an activation code obtained via SMS, email, by calling the issuer's customer service representative (CSR), or the like. Referring back to FIG. 13, the "green" path is the flow directly from step 1306 to step1322 while the "yellow" path is the flow requiring intermediate steps 1312, 1314, 1316, and 1318 between steps 1306 and 1322.

In one or more embodiments, appropriate use can be made of existing functionality; for example, ISO 8583 auth request and auth request response 0100/0110 messages. In some instances, the consumer 1401 receives and accepts the card or loan offer using known techniques. One or more embodiments assume that the account information of the consumer is known; nevertheless, the system still makes checks on whether the device and account are eligible for digitization. The consumer may accept terms and conditions using known techniques, for example. The issuer may start the provisioning if it approves the digitization request, again, adapting known techniques. Communications between the mobile app and the other components can be facilitated using RNS 1409. Other techniques that could be used for digitization instead of ISO messaging include APIs, such as REST or SOAP APIs.

Now continuing, having established that the person 1401 has an account and that the issuer approves of providing the card or the like, send via push notification 1463, 1465 a code indicating that the device is the correct device and can be registered. The mobile app UI 1403 receives this and decrypts the session code using mobile keys, forwarding to the MPA SDK 1405 as at 1467. It is known that the device is a secure device and it is appropriate to establish a session. The session establishment and request for token (digital card) provisioning via the MDES (CMS-D) 1415 are shown at 1469. MDES (CMS-D) 1415 provisions the card profiles and responds to the MPA SDK 1405, at 1471. Once the provisioning is completed MPA SDK 1405 notifies MDES (CMS-D) 1415 that it is complete, at 1473, and MDES (CMS-D) 1415 acknowledges to MPA SDK 1405 at 1475. At 1477, MDES (CMS-D) 1415 sends a notification to MDES 1411 that the provisioning is complete. MDES 1411 creates the account and token mapping at 1479 and then also notifies the wallet server 1407 at 1481. Wallet server 1483 advises the issuer 1413 at 1483 with issuer acknowledgement at 1485.

At 1487, the MPA SDK 1405 removes the digitization flag; at 1489, it informs the MPA UI 1403 regarding the digitization process. At 1491, the consumer 1401 also sees on the device that digitization has been completed and is able to see the digital card in the app. In contrast to current techniques, in one or more embodiments, instead of checking whether the physical card account range is eligible, a check is made as to whether the bank account or customer is eligible.

Currently, the issuer in effect says "OK, I have these ranges approved." The consumer has a physical card at that time and the issuer in effect says "I am approving these card ranges to be digitized. If the consumer enters this card number, e.g., if the first six digits are '5412XX' then I approve." In contrast, in one or more embodiments, there is no card number. For example, the issuer may already know the consumer and may in effect say "you don't even need to do that check; you just need to check whether the device is accurate." Thus, in some instances, account eligibility may not be performed; for example, the issuer may have pre-approved the consumer and then just needs to check that the device is eligible, after verifying the consumer (via online/mobile banking credentials, etc.). Terms and conditions may typically be suppressed in the issuer wallet but need not be suppressed here.

Recapitulation

Given the discussion thus far, it will be appreciated that, in general terms, an exemplary method includes the step of generating a payment token. In one or more embodiments, the payment token is instantiated prior to instantiation of an actual card or without instantiation of an actual card. The payment token is generated within a token bank identification number (BIN) range. See, e.g., step 1455.

A further step 1479 includes linking the payment token with an underlying account number of a consumer.

Step 1471 includes making a first instance of the token available in at least one of a first portable electronic device, a first mobile payment application (MPA), and a first web wallet of the consumer with an associated first primary account sequence number (PSN). A further step includes making a second instance of the token available in at least one of a second portable electronic device, a second mobile payment application (MPA), and a second web wallet of the consumer with an associated second primary account sequence number (PSN).

It should be noted that the terminology first and second portable electronic device, first and second MPA, and first and second web wallet does not imply that there are always two devices, MPAs, or wallets; the terms are used for clarity and precision in the claims. Thus, for example, there could be a making available of the first instance to a portable electronic device and of the second instance to another portable electronic device, in which case there are two portable electronic devices, no MPAs, and no web wallets; or there could, for example, be a making available of the first instance to a portable electronic device and of the second instance to an MPA, in which case there are one portable electronic device, one MPA, and no web wallets.

As used herein a "digital wallet" includes both web wallets and MPAs.

In one or more embodiments, "making available" includes a provisioning process; thus, making the first instance of the token available includes provisioning the first instance of the token onto the first portable electronic device and/or making the second instance of the token available includes provisioning the second instance of the token onto the first portable electronic device.

When the wallet server requests to digitize/create a token, the server communicates with MDES. At that point, MDES generates the token and then responds with the token. Step 1471 thus includes provisioning the token (digital card profile and SUKs/SKs) credentials to a device, a mobile payment application (MPA), or making available to a web wallet of the consumer. For provisioning additional instances, repeat step 1471. In the case of a web wallet, obtain the response of the wallet server and there is no need to send the remote notification to the MPA as there is no MPA in that exemplary case. The remaining steps thus may not occur in the case of a web wallet. Thus, step 1471 is only applicable to provisioning onto a device; in the case of a web wallet, the token data may reside in the cloud.

In some cases, no physical payment card corresponding to the payment token is ever instantiated. In other cases, a physical payment card corresponding to the payment token is instantiated only after generating the payment token. Thus, embodiments typically wait until successful provisioning to issue a physical card; however, this is not a requirement—in some cases, a physical card could be issued after token generation and in parallel with token provisioning.

In the linking step 1479, in some cases, the underlying account is a demand deposit account; in other cases, the underlying account is a payment card account.

As noted, where appropriate, in step 1471 single use keys and/or session keys are provisioned into the first and/or second portable electronic devices for contactless and/or in-app payments. If using a web wallet, SUKs/SKs typically need not be delivered to the device.

It should be noted that a token need not necessarily always be provisioned into a device. For example, a consumer may have a device and may not have a mobile payment application installed, but may instead be using a web browser for a web wallet. In that case, the token could be stored within the cloud, in the wallet server or it could be retrieved from MDES, at the instance of payment. In this aspect, it is not necessary to provision the token into a device. Thus, one or more embodiments are not merely applicable to mobile payments.

Furthermore in this regard, some embodiments relate to an electronic device that does not have a mobile payment app installed but has a web browser in which the consumer uses a web wallet; in such instances, the token could be stored as a cloud token associated with that wallet which is used and retrieved from the cloud at the time of the transaction.

Where appropriate (e.g., upgrading to a new phone), further steps can include removing the first instance of the token, with the associated first primary account sequence number (PSN), from the first portable electronic device, MPA, or web wallet of the consumer (e.g., old phone), and making a third instance of the token available to a third portable electronic device, MPA, or web wallet of the consumer with an associated third primary account sequence number (PSN) (e.g., new phone due to loss of or upgrade from old phone).

Another use case is the suspension of a token. Suppose a consumer loses a physical card; he or she may wish to suspend a corresponding token on his or her device. In another possibility, he or she may have lost a device on which a token resides and may wish to suspend the token for that reason. Suspension might be used where the consumer has some hope of possibly finding the lost card or device. A suspended token can be resumed if the lost card or device is located.

In some cases, if a suspension is desired, the token or PSN are not changed; rather, the single use or session keys are removed from the device; and new single use or session keys are provisioned into the device once its use is resumed. Alternatively, the token state is changed from "active" to "suspended" in the wallet front end (MPA SDK), if an MPA is used, as well as in the wallet backend and the token mapping is suspended at the TSP for that specific PSN value only, whereas the SUKs/SKs remain as is in the device.

In some instances, if there is a token mapping, the affected PSN can be removed from the token mapping or the token mapping could be removed for that specific token.

In one or more embodiments, since all the tokens will have the same token PAN, a list can be maintained in the form of a table of the tokens with a given PAN sequence number that are active. For example, suppose there are nine devices with active tokens. Suppose device number 3 is then lost and token number 3 is suspended. PSN 3 would then be removed from the list in order to be suspended, or otherwise flagged as suspended.

Figure 15:
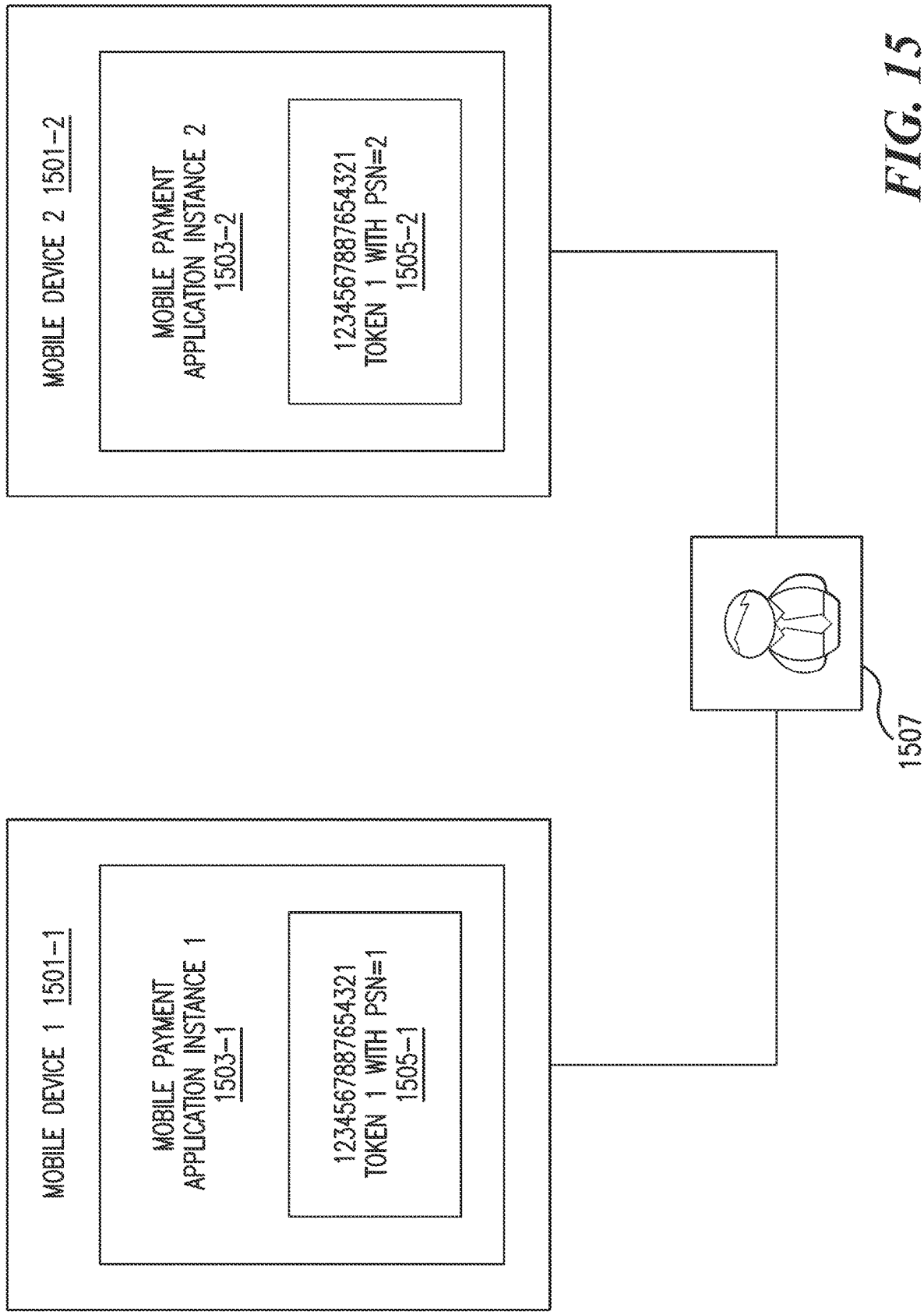
FIG. 15 shows two instances of a token with unique PAN sequence numbers provisioned on first and second mobile electronic devices, according to an aspect of the invention.

FIG. 15 is a non-limiting example of two instances of a token 1505-1, 1505-2 with unique PAN sequence numbers provisioned on first and second mobile electronic devices 1501-1, 1501-2 (of a user 1507) in first and second MPA instances 1503-1, 1503-2. The token is shown as "1234 5678 8765 4321" for illustrative purposes, it being understood that, as per the EMV® Payment Tokenisation Specification: Technical Framework, Version 1.0, the term Payment Token refers to a surrogate value for a PAN that is a 13 to 19-digit numeric value that must pass basic validation rules of an account number, including the Luhn check digit. Payment Tokens are generated within a BIN range that has been designated as a Token BIN Range and flagged accordingly in all appropriate BIN tables. Payment Tokens must not have the same value as or conflict with a real PAN. Note that in a prior art approach, there would be separate tokens on each device, e.g., 1234567887654321 and 1234567887654323 rather than the same token with a different PAN sequence number.

Recalling step 1431, in some cases, the method further includes receiving, from an issuer 1413, an indication that a digitization request from the consumer should be honored. At least the generating and linking steps are then responsive to the indication, for example. As noted, in some instances, the user is pre-approved for credit by the issuer.

Appropriate steps (e.g., generating, linking, and provisioning of the first and second instances) can be repeated for a plurality of additional consumers. In this manner, because the same token is used on multiple devices for each account, with only different PSNs, a plurality of token PANs are saved per consumer, as compared to a scheme wherein each token receives its own token PAN. Currently MDES allows 50 tokens to be issued for a single consumer per account. Since each issuer has many consumers, this would result in high magnitude of BINs being wasted.

As noted, some instances further include performing analytics on data including EFT data pertaining to previous EFT payments made by the consumer, and generating at least one offer for the consumer based on the analytics. The data can, but need not, be consolidated data; consolidated data could include, for example, two or more of EFT data, payment card data, credit agency (e.g. FICO—Fair, Isaac and Company) scores, and the like. The skilled artisan will appreciate that databases can be located in elements 1106 and/or 1104 on which data mining can be performed; data mining can also be performed on elements 154, 2054, 2062, etc. The data can be local and/or international data.

In some instances, generating the offer includes selecting a payment card account type corresponding to the token. For example, depending on financing need, different card profiles could be issued (credit, debit, etc.). In one or more embodiments, the lending platform has an algorithm that consolidates all of the data analytics and can make a decision based on same. In some instances, issuer-defined rules can be provided as a parameter to the issuer when setting up the account. For example, for any transaction value up to $5,000.00, use a debit account; above that, use credit. The operator of a payment card network could also define the rules. Thus, the lending system can make the decision of issuing a credit/debit etc. by taking into account the total amount of the transaction, credit worthiness of the consumer, and available credit line. Alternatively, the issuer could provide these rules as well, in a parametric approach.

The provisioned tokens can be used for payment. Thus, additional steps can include receiving an authorization request including the payment token; translating the payment token to the underlying account number; relaying the authorization request with the underlying account number; receiving an authorization request response with the underlying account number; translating the underlying account number to the payment token; and relaying the authorization request response with the payment token. During token mapping, the PSN value is also kept track of to identify which token is being used.

Token mapping can also be undertaken, in one or more embodiments, for clearing and settlement; embodiments are not limited to token mapping for authorization only. Thus, some instances further include translating the payment token to the underlying account number for clearing and settlement, and carrying out clearing and settlement based on the translation. A service such as MDES or the like replaces all token PANs with account numbers so that the issuer can perform settlement.

The skilled artisan will also appreciate that appropriate token management functions can be performed in one or more embodiments; e.g., updating the token mapping in case of suspension or deletion.

It is worth noting that in one or more embodiments, each token can have a different PSN value as well as different card security code (e.g., CSC, CVD, card verification number, CVV, card verification value code, CVC, V-code, card code verification, SPC, CVC2, or the like, as will be familiar to the skilled artisan), as well as a different expiry date. In some embodiments, it may also have effective dates.

Aspects also include a non-transitory computer readable medium comprising computer executable instructions which when executed by a computer cause the computer to perform any one, some, or all of the method steps described herein, as well as an apparatus including a memory; and at least one processor, coupled to the memory, and operative to perform any one, some, or all of the method steps herein. The memory could include non-volatile memory including the computer executable instructions, which can then be loaded into appropriate (e.g., volatile) memory for execution.

The apparatus can include, for example, a token provisioning platform of a token service provider which carries out the generating and linking, as well as a credential management system of a token service provider, which makes the instances of the token available. Note that the token service provider=MDES 1411 and credential management system=CMS-D 1415. As will be appreciated from the aforementioned EMV specification, Token Service Providers are responsible for building and managing their own proprietary Token Requestor APIs, Token Vaults, Token provisioning platforms, and Token registries. Thus, TSPs typically also have APIs, e.g. MDES has APIs for pre-digitization, CSR, remote transaction, MPA management. Also each TSP contains a token vault. Sometimes the token vault could also be managed separately. A TSP could perform registration; in MDES this is done by the Account Enablement Module. This could also be managed separately e.g. by the issuer or wallet service provider.

System and Article of Manufacture Details

Embodiments of the invention can employ hardware and/or hardware and software aspects. Software includes but is not limited to firmware, resident software, microcode, etc.

Software might be employed, for example, in connection with one or more modules to implement at least a portion of one or more of the elements of the devices, systems and/or flows of FIGS. 12-15; a terminal 122, 124, 125, 126; a reader 132; a host, server, and/or processing center 140, 142, 144 (optionally with data warehouse 154) of a merchant, issuer, acquirer, processor, other third party, or operator of a network 2008 and/or system 1006; and the like. Firmware might be employed, for example, in connection with payment devices such as cards 102, 112, as well as reader 132 and mobile devices to securely store token data.

FIG. 5 is a block diagram of a system 500 that can implement part or all of one or more aspects or processes of the invention. As shown in FIG. 5, memory 530 configures the processor 520 (which could correspond, e.g., to processor portions 106, 116, 130; a processor of a terminal or a reader 132; processors of remote hosts in centers 140, 142, 144; processors of a merchant, issuer, acquirer, processor, other third party, or operator of a network 2008 and/or devices, systems and/or flows of FIGS. 12-15; and the like); to implement one or more aspects of the methods, steps, and functions disclosed herein (collectively, shown as process 580 in FIG. 5). Different method steps can be performed by different processors. The memory 530 could be distributed or local and the processor 520 could be distributed or singular. The memory 530 could be implemented as an electrical, magnetic or optical memory, or any combination of these or other types of storage devices (including memory portions as described above with respect to cards 102, 112). It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an application specific integrated circuit (ASIC) or field programmable gate array (FPGA) rather than using firmware. Display 540 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing aspects of network 2008 and/or systems 1006, and/or devices, systems and/or flows of FIGS. 12-15; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140, 142, 144, 2004, 2006, 2008, 2010; a computer implementing aspects of network 2008 and/or systems 1006, and/or devices, systems and/or flows of FIGS. 12-15; hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program product comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 5) running a server program. It will be understood that such a physical server may or may not include a display, keyboard, or other input/output components. A "host" includes a physical data processing system (for example, system 500 as shown in FIG. 5) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers, mobile devices, or personal computers, located at one or more of the entities in the figures, as well as within the payment network 2008, payment system 1006 and/or devices, systems and/or flows of FIGS. 12-15. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., US; SAS® software available from SAS Institute, Inc., sCary, N.C., US), spreadsheets (e.g., MICROSOFT EXCEL® software available from Microsoft Corporation, Redmond, Wash., US), and the like. The computers can be programmed to implement the logic and/or data flow depicted in the figures. In some instances, messaging and the like may be in accordance with the International Organization for Standardization (ISO) Specification 8583 Financial transaction card originated messages Interchange message specifications and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing payment tokens, said method comprising:
    generating a payment token, said payment token being generated within a token bank identification number (BIN) range;
    linking said payment token with an underlying account number of a consumer;
    making a first instance of said token available in at least one of a first portable electronic device, a first mobile payment application (MPA), and a first web wallet of said consumer with an associated first primary account sequence number (PSN);
    making a second instance of said token available in at least one of a second portable electronic device, a second mobile payment application (MPA), and a second web wallet of said consumer with an associated second primary account sequence number (PSN);
    provisioning session keys into at least one of said first and second portable electronic device for at least one of contactless and in-app payments;
    removing said session keys from said at least one of said first and second portable electronic devices during a suspension period, without removing a corresponding one of said first and second token instances from said at least one of said first and second portable electronic devices during said suspension period; and
    provisioning new session keys to said at least one of said first and second portable electronic devices subsequent to said suspension period.

2. The method of claim 1, wherein at least one of making said first instance of said token available and making said second instance of said token available comprises provisioning at least one of said first instance of said token onto said first portable electronic device and said second instance of said token onto said second portable electronic device.

3. The method of claim 1, further comprising never instantiating a physical payment card corresponding to said payment token.

4. The method of claim 1, further comprising instantiating a physical payment card corresponding to said payment token only after generating said payment token.

5. The method of claim 1, wherein, in said linking step, said underlying account comprises a demand deposit account.

6. The method of claim 1, wherein, in said linking step, said underlying account comprises a payment card account.

7. The method of claim 1, further comprising:
    removing said first instance of said token, with said associated first primary account sequence number (PSN), from said first portable electronic device, said first mobile payment application (MPA), or said first web wallet of said consumer; and
    provisioning a third instance of said token onto a third portable electronic device third mobile payment application (MPA), or said third web wallet of said consumer with an associated third primary account sequence number (PSN).

8. The method of claim 1, further comprising receiving, from an issuer, an indication that a digitization request from said consumer should be honored, wherein at least said generating and linking steps are responsive to said indication.

9. The method of claim 1, further comprising repeating said generating, linking, and provisioning of first and second instances for a plurality of additional consumers, whereby a plurality of token primary account numbers (token PANs) are saved as compared to a scheme wherein each token receives its own token PAN.

10. The method of claim 1, further comprising:
    performing data analytics on data pertaining to previous electronic funds transfer (EFT) payments made by said consumer; and
    generating at least one offer for said consumer based on said analytics.

11. The method of claim 10, further comprising performing additional data analytics on data pertaining to at least one of previous payment card transactions, and credit agency scores.

12. The method of claim 11, wherein said generating of said offer comprises selecting a payment card account type corresponding to said token.

13. The method of claim 1, further comprising:
    receiving an authorization request including said payment token;
    translating said payment token to said underlying account number;

relaying said authorization request with said underlying account number;

receiving an authorization request response with said underlying account number;

translating said underlying account number to said payment token; and relaying said authorization request response with said payment token.

14. The method of claim 1, further comprising translating said payment token to said underlying account number for clearing and settlement, and carrying out clearing and settlement based on said translation.

15. A non-transitory computer readable medium comprising computer executable instructions which when executed by a computer cause the computer to perform the method of:
generating a payment token, said payment token being generated within a token bank identification number (BIN) range;

linking said payment token with an underlying account number of a consumer;

making a first instance of said token available in at least one of a first portable electronic device, a first mobile payment application (MPA), and a first web wallet of said consumer with an associated first primary account sequence number (PSN); and making a second instance of said token available in at least one of a second portable electronic device, a second mobile payment application (MPA), and a second web wallet of said consumer with an associated second primary account sequence number (PSN);

provisioning session keys into at least one of said first and second portable electronic device for at least one of contactless and in-app payments;

removing said session keys from said at least one of said first and second portable electronic devices during a suspension period, without removing a corresponding one of said first and second token instances from said at least one of said first and second portable electronic devices during said suspension period; and provisioning new session keys to said at least one of said first and second portable electronic devices subsequent to said suspension period.

16. An apparatus comprising:
a memory; and
at least one processor, coupled to said memory, and operative to:
generate a payment token, said payment token being generated within a token bank identification number (BIN) range;

link said payment token with an underlying account number of a consumer;

make a first instance of said token available in at least one of a first portable electronic device, a first mobile payment application (MPA), and a first web wallet of said consumer with an associated first primary account sequence number (PSN); and make a second instance of said token available in at least one of a second portable electronic device, a second mobile payment application (MPA), and a second web wallet of said consumer with an associated second primary account sequence number (PSN);

provision session keys into at least one of said first and second portable electronic device for at least one of contactless and in-app payments;

remove said session keys from said at least one of said first and second portable electronic devices during a suspension period, without removing a corresponding one of said first and second token instances from said at least one of said first and second portable electronic devices during said suspension period; and provision new session keys to said at least one of said first and second portable electronic devices subsequent to said suspension period.

17. The apparatus of claim 16, wherein:
said generating and linking steps are carried out by a token provisioning platform of a token service provider; and
said steps of making said instances of said token available are carried out by a credential management system of a token service provider.

18. A method comprising:
generating a payment token, said payment token being generated within a token bank identification number (BIN) range;

linking said payment token with an underlying account number of a consumer;

making a first instance of said token available in at least one of a first portable electronic device, a first mobile payment application (MPA), and a first web wallet of said consumer with an associated first primary account sequence number (PSN);

making a second instance of said token available in at least one of a second portable electronic device, a second mobile payment application (MPA), and a second web wallet of said consumer with an associated second primary account sequence number (PSN);

flagging one of said first and second primary account sequence numbers as suspended during a suspension period, without removing a corresponding one of said first and second token instances during said suspension period; and removing said flagging subsequent to said suspension period.

* * * * *